(12) United States Patent
Coppoolse

(10) Patent No.: US 10,732,750 B2
(45) Date of Patent: Aug. 4, 2020

(54) COMMON ELECTRODE DRIVING IN INTEGRATED DISPLAY ARRAYS

(71) Applicant: PARADE TECHNOLOGIES, LTD., San Jose, CA (US)

(72) Inventor: Roel Coppoolse, San Jose, CA (US)

(73) Assignee: PARADE TECHNOLOGIES, LTD., San Jose, CA (US)

( * ) Notice: Subject to any disclaimer, the term of this patent is extended or adjusted under 35 U.S.C. 154(b) by 0 days.

(21) Appl. No.: 16/367,146

(22) Filed: Mar. 27, 2019

(65) Prior Publication Data

US 2020/0103997 A1 Apr. 2, 2020

Related U.S. Application Data

(60) Provisional application No. 62/739,787, filed on Oct. 1, 2018.

(51) Int. Cl.
| | |
|---|---|
| *G06F 3/041* | (2006.01) |
| *G06F 3/044* | (2006.01) |
| *G09G 3/36* | (2006.01) |
| *G02F 1/1333* | (2006.01) |
| *G02F 1/1368* | (2006.01) |
| *G02F 1/1343* | (2006.01) |

(52) U.S. Cl.
CPC .......... *G06F 3/0412* (2013.01); *G02F 1/1368* (2013.01); *G02F 1/13338* (2013.01); *G02F 1/134336* (2013.01); *G06F 3/0446* (2019.05); *G06F 3/04164* (2019.05); *G09G 3/3648* (2013.01); *G02F 2201/121* (2013.01); *G09G 2300/0426* (2013.01)

(58) Field of Classification Search
None
See application file for complete search history.

(56) References Cited

U.S. PATENT DOCUMENTS

| | | | | |
|---|---|---|---|---|
| 9,772,723 B2* | 9/2017 | Wang | ..................... | G06F 3/0412 |
| 2013/0307789 A1* | 11/2013 | Karamath | ............... | G06F 3/016 |
| | | | | 345/173 |
| 2014/0232955 A1* | 8/2014 | Roudbari | ................ | G06F 3/041 |
| | | | | 349/12 |
| 2016/0320898 A1* | 11/2016 | Tang | .................... | G09G 3/3655 |

\* cited by examiner

*Primary Examiner* — Duane N Taylor, Jr.
(74) *Attorney, Agent, or Firm* — Morgan, Lewis & Bockius LLP

(57) ABSTRACT

This application is directed to a display device that integrates a two-dimensional array of display elements and a two-dimensional array of capacitive sense elements. A common electrode layer includes a two-dimensional array of common electrodes, which are used in both display elements and capacitive sense elements. One or more sensing control interconnects and a plurality of driving interconnects are arranged in parallel with each other and on top of a first row of common electrodes. Each sensing control interconnect is configured to provide a touch sensing control signal to enable/disable electrical access to common electrodes in the first row of common electrodes in a touch sensing mode. Each common electrode in the first row is electrically coupled to two or more respective driving interconnects in a display driving mode, while each of the plurality of driving interconnects is electrically coupled to a single respective common electrode.

20 Claims, 14 Drawing Sheets

COMMON ELECTRODE DRIVING IN INTEGRATED DISPLAY ARRAYS

CROSS REFERENCE TO RELATED APPLICATION

This application claims priority to U.S. Provisional Patent Application No. 62/739,787, titled "VCOM Driver for Display Panel with Shared Display Data and Touch Sense Lines," filed on Oct. 1, 2018, which is hereby incorporated by reference in its entirety.

TECHNICAL FIELD

The disclosed embodiments relate generally to electronic devices, including methods and systems for integrating in a display device a two dimensional display array and a two-dimensional capacitive sense array, which share common electrodes and provide low-resistance interconnects to access the common electrodes.

BACKGROUND

Touch screens that utilize capacitive sense arrays are widely applied in today's industrial and consumer product markets. Capacitive sense arrays can be found in cellular phones, GPS devices, set-top boxes, cameras, computer screens, MP3 players, digital tablets, and the like, replacing mechanical buttons, knobs, and other conventional user interface controls. A capacitive sense array is often disposed below a touch sensing surface of a touch screen, and includes an array of capacitive sense elements. Capacitances of these capacitive sense elements vary when an object (e.g., a finger, a hand, a stylus, or another object) comes into contact with or hovers above the touch sensing surface. A processing device coupled to the capacitive sense array then measures the capacitances of the capacitive sense elements and identifies capacitance variations of the capacitive sense elements for determining a touch or presence of the object associated with the touch sensing surface. The use of the capacitive sense array has offered a convenient and reliable user interface solution that is feasible under many harsh conditions.

SUMMARY

Although capacitive sense arrays made of capacitive sense elements have been widely used in many industrial and consumer products, they typically involve one or more dedicated touch sensing layers that are separate from other layers of materials used for display functions of a touch screen. It would be beneficial to integrate touch detection into existing display related infrastructure of a conventional display screen without causing any detrimental impact on its display functions (e.g., without compromising a display quality or refresh rate of the display screen).

Various embodiments of systems, methods, and devices within the scope of the appended claims each have several aspects, no single one of which is solely responsible for the attributes described herein. After considering this disclosure, one will understand how the aspects of various embodiments are used to arrange interconnects on an integrated display device for the purposes of reducing interconnect resistance for both display elements and capacitive sense elements. These embodiments of interconnect arrangement enhance display quality of the integrated display device and transition rates between a display driving mode and a touch sensing mode of the integrated display device.

In one aspect, this application discloses an integrated display device having a two-dimensional array of display elements and a two-dimensional array of capacitive sense elements. Each display element includes (i) a respective display electrode located in a display electrode layer and (ii) a respective common electrode located in a common electrode layer. The display electrode layer includes a two-dimensional array of display electrodes having m rows and n columns of display electrodes, and the common electrode layer includes a two-dimensional array of common electrodes having k rows and l columns of common electrodes. Each capacitive sense element includes a distinct one of the common electrodes of the two-dimensional array of display elements. One or more sensing control interconnects are arranged on top of a first row of the k rows of common electrodes. Each sensing control interconnect is configured to provide a touch sensing control signal to enable/disable electrical access to common electrodes in the first row of common electrodes. A plurality of driving interconnects is arranged on top of the first row of common electrodes and in parallel with the one or more sensing control interconnects. Each common electrode in the first row of common electrodes is electrically coupled to two or more respective driving interconnects of the plurality of driving interconnects. Each of the plurality of driving interconnects is electrically coupled to only one common electrode.

In some embodiments, the integrated display device further includes a plurality of display control interconnects arranged on top of the first row of common electrodes and in parallel with the one or more sensing control interconnects. Each display control interconnect is configured to provide a display control signal to enable/disable electrical access to display electrodes in a respective row of the m rows of display electrodes. Further, in some embodiments, the integrated display device further includes a plurality of data interconnects arranged on top of a first column of the l columns of common electrodes and perpendicular to the plurality of display control interconnects and the plurality of driving interconnects. Each of the plurality of data interconnects is electrically coupled to display electrodes in a respective column of the n columns of display electrodes.

Additionally, in some embodiments, the integrated display device further includes a first plurality of thin film transistors (TFTs). Each of the first plurality of TFTs corresponds to a respective display electrode, a respective one of the plurality of data interconnects, and a respective one of the plurality of display control interconnects, which are electrically coupled to a drain, a source, and a gate of the respective TFT, respectively. In a display driving mode, one of the first plurality of TFTs is turned on by the respective one of the plurality of display control interconnects, allowing data provided by the respective one of the plurality of data interconnects to be written into and drive the respective display electrode. Further, in the display driving mode, a respective one of the plurality of driving interconnects electrically couples the common electrode corresponding to the respective display electrode of the same display element to a reference voltage.

Further, in some embodiments, the integrated display device further includes one or more third TFTs. Each of the one or more third TFTs corresponds to a respective common electrode, a respective one of the plurality of data interconnects, and a respective one of the plurality of sensing control interconnects, which are electrically coupled to a drain, a source, and a gate of the respective third TFT, respectively.

In a touch sensing mode, one of the third TFTs is turned on by the respective one of the plurality of sensing control interconnects, allowing a signal at the respective common electrode to be read to the respective one of the plurality of data interconnects.

In some embodiments, the first row of common electrodes corresponds to m/k rows of display electrodes. Each row of the m/k rows of display electrodes corresponds to (1) a respective display control interconnect and (2) one of the driving interconnects or one of the sensing control interconnects.

In some embodiments, each of the k rows of common electrodes corresponds to m/k rows of display electrodes and 2 m/k interconnects extending along a first direction. The 2 m/k interconnects include m/k rows of display control interconnects and two or more of the plurality of driving interconnects for each of the l columns of common electrodes. Remaining interconnects of the 2 m/k interconnects are used as the one or more sensing control interconnects to enable/disable the electrical access to the respective row of common electrodes. For example, the two-dimensional array of display electrodes has 2160 rows and 1080 columns of display electrodes, and the two-dimensional array of common electrodes has 36 rows and 18 columns of common electrodes that are aligned with the two-dimensional array of display electrodes. Each common electrode corresponds to 60×60 display electrodes. Each common electrode corresponds to 60 display control interconnects, 3 driving interconnects for each of 18 columns of common electrodes, and 6 sensing control interconnects that are arranged along a first dimension of the integrated display device. Each common electrode corresponds to 60 data interconnects that are arranged along a second dimension perpendicular to the first dimension of the integrated display device.

In some embodiments, the one or more sensing control interconnects and the plurality of driving interconnects extend along a first dimension of the integrated display device, and the integrated display device has a second dimension that is perpendicular to the first dimension. The second dimension of the integrated display device has a size greater than the size of the first dimension.

In some embodiments, the integrated display device has a touch sensing mode and a display driving mode. The touch sensing and display driving modes are integrated by time-division multiplexing. Further, in some embodiments, the two-dimensional array of display elements is configured to operate synchronously in the display driving mode, and the two-dimensional array of capacitive sense elements is configured to operate synchronously in the touch sensing mode. Alternatively, in some embodiments, the integrated display device includes a first subset of display elements sharing common mode electrodes with a first subset of capacitive sense elements and a second subset of display elements sharing common mode electrodes with a second subset of capacitive sense elements. The first subset of display elements is configured to operate synchronously in a first display driving mode, and the second subset of display elements is configured to operate synchronously in a second display driving mode that is shifted from the first display driving mode with a phase. The first subset of capacitive sense elements is configured to operate synchronously in a first touch sensing mode, which is integrated with the first display driving mode with time-division multiplexing, and the second subset of capacitive sense elements is configured to operate synchronously in a second touch sensing mode, which is integrated with the second display driving mode with time-division multiplexing.

In some embodiments, the integrated display device further includes a first transistor electrically coupled to a first end of a first driving interconnect and a second transistor electrically coupled to a second end of the first driving interconnect that is opposite to the first end. The first and second transistors are configured to drive the first driving interconnect simultaneously.

In another aspect of this application, a computing machine includes an integrated display unit, one or more processors, and memory storing one or more programs configured for execution by the one or more processors. The one or more programs include instructions for driving the integrated display unit. The integrated display unit includes a two-dimensional array of display elements and a two-dimensional array of capacitive sense elements. Each display element includes (i) a respective display electrode located in a display electrode layer and (ii) a respective common electrode located in a common electrode layer. The display electrode layer includes a two-dimensional array of display electrodes having m rows and n columns of display electrodes, and the common electrode layer includes a two-dimensional array of common electrodes having k rows and l columns of common electrodes. Each capacitive sense element includes a distinct one of the common electrodes of the two-dimensional array of display elements. One or more sensing control interconnects are arranged on top of a first row of the k rows of common electrodes. Each sensing control interconnect is configured to provide a touch sensing control signal to enable/disable electrical access to common electrodes in the first row of common electrodes. A plurality of driving interconnects is arranged on top of the first row of common electrodes and in parallel with the one or more sensing control interconnects. Each common electrode in the first row of common electrodes is electrically coupled to two or more respective driving interconnects of the plurality of driving interconnects. Each of the plurality of driving interconnects is electrically coupled to only one common electrode.

In another aspect of this application, an electronic device includes an integrated display unit and a processing device. The integrated display unit includes a two-dimensional array of display elements and a two-dimensional array of capacitive sense elements. The processing device includes at least a capacitance sense circuit configured to enable detection of touch events from the array of capacitive sense elements and a pixel drive circuit configured to drive the array of display elements. Each display element includes (i) a respective display electrode located in a display electrode layer and (ii) a respective common electrode located in a common electrode layer. The display electrode layer includes a two-dimensional array of display electrodes having m rows and n columns of display electrodes, and the common electrode layer includes a two-dimensional array of common electrodes having k rows and l columns of common electrodes. Each capacitive sense element includes a distinct one of the common electrodes of the two-dimensional array of display elements. One or more sensing control interconnects are arranged on top of a first row of the k rows of common electrodes. Each sensing control interconnect is configured to provide a touch sensing control signal to enable/disable electrical access to common electrodes in the first row of common electrodes. A plurality of driving interconnects is arranged on top of the first row of common electrodes and in parallel with the one or more sensing control interconnects. Each common electrode in the first row of common electrodes is electrically coupled to two or more respective driving interconnects of the plurality of driving interconnects. Each of the plurality of driving interconnects is electrically coupled to only one common electrode.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Like reference numerals refer to corresponding parts throughout the several views of the drawings.

DESCRIPTION OF EMBODIMENTS

Figure 1:
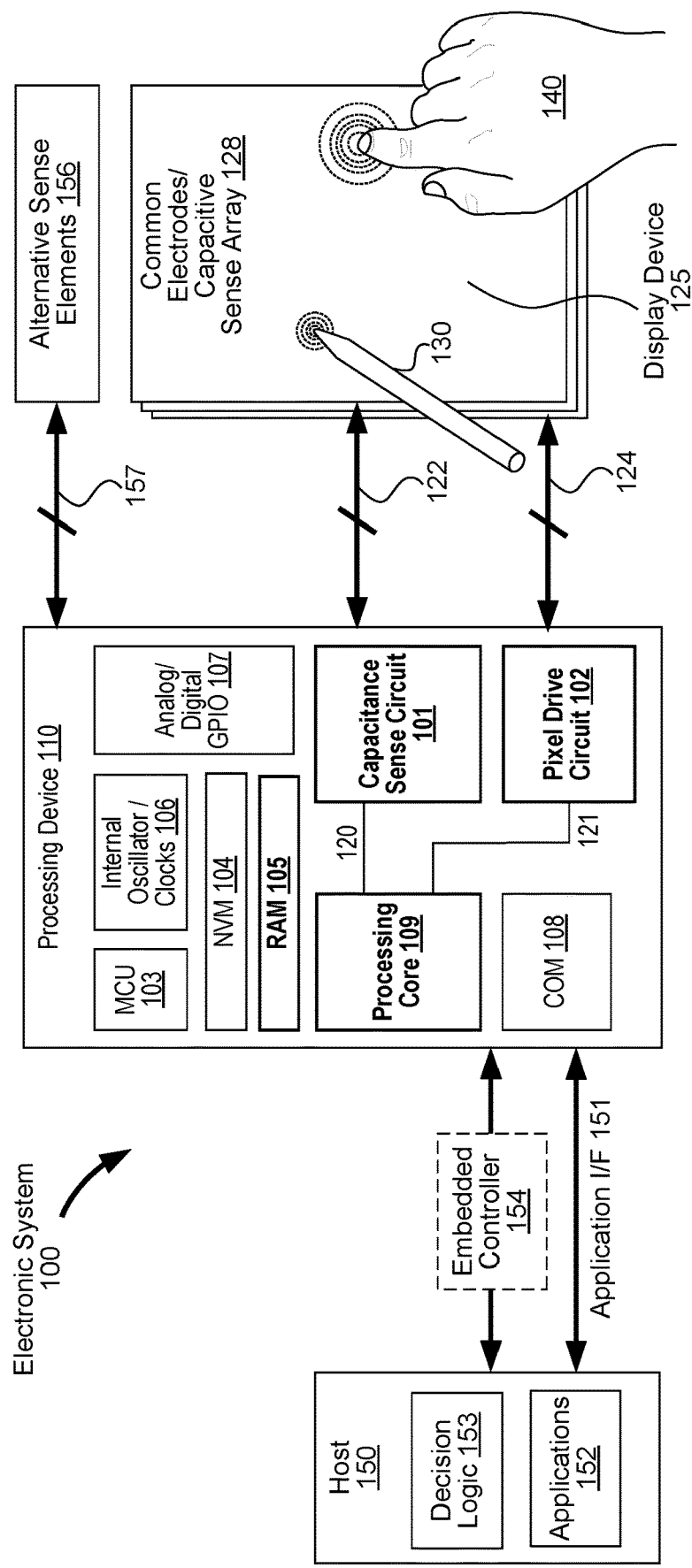
FIG. 1 is a block diagram illustrating an electronic device in accordance with some embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, mechanical structures, circuits, and networks have not been described in detail so as not to unnecessarily obscure aspects of the embodiments.

This application is directed to an integrated display device including a two-dimensional array of display elements and a two-dimensional array of capacitive sense elements. Each display element includes a respective display electrode located in a display electrode layer and a respective common electrode located in a common electrode layer. Each capacitive sense element includes a distinct one of the common electrodes of the array of display elements. The array of display elements and the array of capacitive sense elements share the common electrodes, but use them for different purposes. The array of display elements has a resolution of m×n (i.e., includes m rows and n columns of display elements), and therefore, the display electrode layer includes a two-dimensional array of display electrodes having m rows and n columns of display electrodes. In contrast, the array of capacitive sense elements has a resolution of k×l (i.e., includes k rows and l columns of capacitive sense elements), and the common electrode layer includes a two-dimensional array of common electrodes having k rows and l columns of common electrodes. As a result, each common electrode corresponds to m/k rows and n/l columns of display electrodes.

In a touch sensing mode (also called a touch sensing state), the common electrodes are individually addressed for the purposes of monitoring their capacitance variations and corresponding touch events. For this purpose, each common electrode can be scanned in the touch sensing mode to measure a respective self capacitance of the common electrode with reference to the ground. In a display driving mode (also called a display driving state), the common electrodes cannot be shorted to each other directly, and have to be individually addressed without compromising their addressability in the touch sensing mode. When addressed in the display driving mode, the common electrodes are coupled to a reference voltage for the purposes of driving their corresponding display elements in the display driving mode.

In accordance with various embodiments of this application, at least two interconnects are configured to drive each of the common electrodes in the display driving mode. These interconnects are preferably arranged along a first dimension of the integrated display device that has a smaller size than a second dimension. In some embodiments, an interconnect driving a common electrode is preferably driven from both ends of the interconnect in the display driving mode. By these means, parasitic resistance associated with the common electrodes is reduced, and the common electrodes can therefore be driven efficiently with low parasitic resistance, enhancing both a display refresh rate associated with the display driving mode and a transition rate from touch sensing to display driving.

FIG. 1 is a block diagram illustrating an electronic system 100 having a processing device 110, which produces display driving signals and processes capacitive sense signals in accordance with some embodiments. The processing device 110 is electrically coupled to a display device 125, which includes a display element array. The display element array further includes a two-dimensional (2D) array of display elements made from a plurality of display pixels, a plurality of display electrodes, and a plurality of common electrodes 128. In each display element, a display pixel is disposed between a display electrode and a common electrode 128. The processing device 110 operates in two states including a display driving state and a touch sensing state. In the display driving state, a voltage bias is generated and applied between the display and common electrodes of each display pixel to enable display of a color on the respective display pixel. In the touch sensing state, the plurality of common electrodes 128 are reconfigured to operate as a capacitive sense array 128 (also called a two-dimensional (2D) array of capacitive sense elements), and the processing device 110 is configured to measure capacitance variations at the plurality of common electrodes 128 and detect one or more touches proximate to a surface of the display device 125. In some embodiments, the processing device 110 alternates between the display driving state and the touch sensing state according to a predetermined duty cycle (e.g., 80% for the display driving state). The device 110 detects a contact with or a proximity to a touch sensing surface associated with the display element array without interfering with current display operations of the display element array. More details of the display device 125 are explained below with reference to FIGS. 2-7.

The processing device 110 can detect conductive objects, such as touch objects 140 (e.g., a finger), a passive or active stylus 130, or any combination thereof when operating in the touch sensing state. The capacitance sense circuit 101 measures touch data created by a touch using the capacitive sense array 128 reconfigured from the plurality of common electrodes 128. The touch may be detected by a single or multiple sensing cells, each cell representing an isolated sense element or an intersection of sense elements (e.g., electrodes) of the reconfigured capacitive sense array 128. In some embodiments, when the capacitance sense circuit 101 measures capacitance of the reconfigured capacitive sense array 128, the processing device 110 acquires a two dimensional capacitive image of the touch sensing object and processes the capacitive image data for peaks and positional information. In some embodiments, the processing device 110 is coupled to a microcontroller (e.g., an external host device 150), which obtains a capacitance touch signal data set from the reconfigured capacitive sense array 128. In some embodiments, finger detection firmware executing on the microcontroller identifies data set areas that indicate touches, detects and processes peaks, calculates the coordinates, or any combination thereof. The microcontroller can report the precise coordinates and other information to an application processor.

In some embodiments, the electronic system 100 includes one or more of a processing device 110, a display device 125 (including a display element array), a stylus 130, and a host 150. The common electrodes 128 may include electrodes made of conductive material, such as copper, and are reconfigured for the capacitive sense array 128, including capacitive sense elements that are electrodes made of the same conductive material. The common electrodes and sense elements may also be part of an indium-tin-oxide (ITO) panel. In the display driving state, the common electrodes 128 provide a bias voltage or a reference voltage to each display pixel of the display element array, thereby enabling display of a color on the respective display pixel. In the depicted embodiment, the electronic system 100 includes the common electrodes 128 coupled to the processing device 110 via a bus 124, and the common electrodes 128 are configured to receive display driving signals from the processing device 110 via the bus 124. More specifically, the display driving signals are generated by a pixel drive circuit 102 of the processing device 110. Alternatively, in the touch sensing state, the capacitive sense elements of the reconfigured capacitive sense array 128 can be used to allow the capacitance sense circuit 101 to measure self-capacitance, mutual capacitance, or any combination thereof. In the depicted embodiment, the electronic system 100 includes the reconfigured capacitive sense array 128 coupled to the processing device 110 via a bus 122, and the reconfigured capacitive sense array 128 is configured to provide capacitive sense signals to a capacitance sense circuit 101 of the processing device 110 via the bus 122. The reconfigured capacitive sense array 128 may include a multi-dimensional capacitive sense array. In some embodiments, the multi-dimensional sense array includes multiple sense elements, organized as rows and columns. In some embodiments, the reconfigured capacitive sense array 128 has a flat surface profile. In some embodiments, the capacitive sense array 128 has a non-flat surface profile. In some embodiments, other configurations of capacitive sense arrays can be used. For example, instead of vertical columns and horizontal rows, the capacitive sense array 128 may have a hexagonal arrangement, or the like, as would be appreciated by one of ordinary skill in the art having the benefit of this disclosure.

In some embodiments, the electronic system 100 further includes one or more force electrodes (not shown in FIG. 1) that are disposed below and separated from the reconfigured capacitive sense array 128. The one or more force electrodes are electrically coupled to the processing device 110, and are configured to provide force signals to the processing device 110 for determining force associated with candidate touches detected from the reconfigured capacitive sense array 128. In some embodiments, the force signals are measured from capacitance variation associated with the one or more force electrodes, and used to improve accuracy of touch detection based on the capacitive sensing signals.

The operations and configurations of the processing device 110 and the reconfigured capacitive sense array 128 for detecting and tracking a touch object 140 or a stylus 130 are described herein. In short, the processing device 110 is configured to detect the presence of a touch object 140, the presence of a stylus 130 on the reconfigured capacitive sense array 128, or any combination thereof. If the touching object is an active stylus, the active stylus 130 is configured to operate as the timing "master," and the processing device 110 adjusts the timing of the reconfigured capacitive sense array 128 to match that of the active stylus 130. In some embodiments, the reconfigured capacitive sense array 128 is capacitively coupled to the active stylus 130, as opposed to conventional inductive stylus applications. It should also be noted that the same assembly (e.g., the processing device 110) used with the reconfigured capacitive sense array 128, which is configured to detect touch objects 140, is also used to detect and track the stylus 130 without an additional PCB layer for inductively tracking the active stylus 130.

In some embodiments, the processing device 110 includes analog and/or digital general purpose input/output ("GPIO") ports 107. The GPIO ports 107 may be programmable. The GPIO ports 107 may be coupled to a Programmable Interconnect and Logic ("PIL"), which acts as an interconnect between the GPIO ports 107 and a digital block array of the processing device 110 (not shown). In some embodiments, the digital block array is configured to implement a variety of digital logic circuits (e.g., DACs, digital filters, or digital control systems) using configurable user modules ("UMs"). The digital block array may be coupled to a system bus. The processing device 110 may also include memory, such as random access memory ("RAM") 105 and non-volatile memory ("NVM") 104. The RAM 105 may be static RAM ("SRAM"). The non-volatile memory 104 may be a flash memory, which may be used to store firmware (e.g., control algorithms executable by the processing core 109 to implement operations described herein). The processing device 110 may also include a memory controller unit ("MCU") 103 coupled to the memory and the processing core 109. The processing core 109 is a processing element configured to execute instructions or perform operations. The processing device 110 may include other processing elements as would be appreciated by one of ordinary skill in the art having the benefit of this disclosure. It should also be noted that the memory may be internal to the processing device 110 or external to it. When the memory is internal, the memory may be coupled to a processing element, such as the processing core 109. When the memory is external to the processing device 110, the processing device 110 is coupled to the other device in which the memory resides, as would be appreciated by one of ordinary skill in the art having the benefit of this disclosure.

Some or all of the operations of the processing core 109 may be implemented in firmware, hardware, software, or some combination thereof. The processing core 109 may receive signals from the capacitance sense circuit 101, determine the state of the reconfigured capacitive sense array 128 (e.g., determining whether an object is detected on or in proximity to the touch sensing surface), resolve where the object is on the sense array (e.g., determining the location of the object), track the motion of the object, or generate other information related to an object detected at the touch sensor. In some embodiments, the processing core 109 includes the capacitance sense circuit 101. In some embodiments, the processing core 109 performs some or all of the functions of capacitance sense circuit 101. Additionally, in some embodiments, the processing core 109 provides display information to the pixel drive circuit 102, such that the pixel drive circuit 102 can be configured to drive individual display pixels in the display device 125 to display images or videos based on the display information. In some embodiments, the processing core 109 includes some or all functions of the pixel drive circuit 102 (e.g., part or all of the pixel drive circuit 102 is integrated in the processing core 109).

In some embodiments, the processing core 109 generates a touch detection enable signal 120 and a display driving enable signal 121 that are synchronized to control the capacitance sense circuit 101 and the pixel drive circuit 102 to detect touch locations and drive individual display pixels, respectively. The touch detection enable signal 120 is used to enable a touch sensing state. In the touch sensing state, the common electrodes 128 are decoupled from the pixel drive circuit 102 and reconfigured for the capacitive sense array 128 coupled to the capacitance sense circuit 101. Self or mutual capacitance of sense elements of the reconfigured capacitive sense array 128 is scanned by the capacitance sense circuit 101. One or more touch locations are thereby detected if one or more objects touch the touch sensing surface of the electronic system 100. Alternatively, in some embodiments, the display driving enable signal 121 is used to enable a display driving state (e.g., decouple the capacitance sense circuit 101 from the reconfigured capacitive sense array 128 and couple the pixel drive circuit 102 to the common electrodes 128). In such a display driving state, the pixel drive circuit 102 enables a bias voltage and a reference voltage corresponding to an intended color on each display pixel of the display element array. The display pixel displays the intended color when the bias voltage and the reference voltage are applied on the display and common electrodes of the respective display pixel. It is noted that the touch detection enable signal 120 and the display driving enable signal 121 can be enabled sequentially and share operation time of the common electrodes/capacitive sense array 128. More details are discussed with reference to FIGS. 8A and 8B.

The processing device 110 may also include an analog block array (not shown) (e.g., a field-programmable analog array). The analog block array is also coupled to the system bus. An analog block array may be configured to implement a variety of analog circuits (e.g., ADCs or analog filters) using, in some embodiments, configurable UMs. The analog block array may also be coupled to the GPIO 107.

In some embodiments, the capacitance sense circuit 101 is integrated into the processing device 110. The capacitance sense circuit 101 includes analog I/O for coupling to an external component, such as a touch-sensor pad (not shown), a reconfigured capacitive sense array 128, a touch-sensor slider (not shown), a touch-sensor buttons (not shown), and/or other devices. The capacitance sense circuit 101 may be configured to measure capacitance using mutual-capacitance sensing techniques, self-capacitance sensing technique, charge-coupling techniques, charge balancing techniques, or the like. In some embodiments, the capacitance sense circuit 101 operates using a charge accumulation circuit, a capacitance modulation circuit, or other capacitance sensing methods known by those skilled in the art. In some embodiments, other capacitance sensing circuits may be used. The mutual capacitive sense arrays, or touch screens, as described herein, may include a transparent, conductive sense array disposed on, in, or under either a visual display itself (e.g. LCD monitor), or a transparent substrate in front of the display.

A reconfigured capacitive sense array 128 includes a plurality of capacitive sense elements. When a touch object 140 (such as a finger) or stylus 130 approaches the reconfigured capacitive sense array 128, the object causes a decrease in mutual capacitance between some of the sense elements. In some embodiments, the presence of a finger increases the capacitance of the electrodes to the environment (Earth) ground, typically referred to as self-capacitance change. In some embodiments, the plurality of sense elements of the reconfigured capacitive sense array 128 are configured to operate as transmit (TX) electrodes and receive (RX) electrodes of a mutual capacitive sense array in a first mode to detect touch objects, and to operate as electrodes of a coupled-charge receiver in a second mode to detect a stylus on the same electrodes of the sense array. Specifically, in the first mode, a mutual capacitance is measured at an intersection of a RX electrode and a TX electrode when a transmit signal provided at the RX electrode is coupled to the TX electrode. Utilizing the change in mutual capacitance, the location of the finger on the reconfigured capacitive sense array 128 is determined by identifying an RX electrode having a decreased coupling capacitance with a TX electrode whose signal was applied at the time the decreased capacitance is measured on the RX electrode. Therefore, the locations of one or more touch objects can be determined by sequentially scanning the capacitances associated with the intersection of electrodes. In some embodiments, in the second mode, the stylus 130 is activated to generate a stylus transmit signal, which is then coupled to a subset of sense elements of the reconfigured capacitive sense array 128 that is located below the stylus 130.

In some embodiments, the processing device 110 calibrates the capacitive sense elements by determining baselines for the sense elements. In some embodiments, interpolation is used to detect finger position at a better resolution than the spatial pitch of the capacitive sense elements of the reconfigured capacitive sense array 128, and various types of coordinate interpolation algorithms are optionally used to determine the center of a touch.

The processing device 110 may include internal oscillator/clocks 106 and a communication block ("COM") 108. In some embodiments, the processing device 110 includes a spread-spectrum clock (not shown). The oscillator/clocks 106 provides clock signals to one or more of the components of processing device 110. The communication block 108 may be used to communicate with an external component, such as an application processor 152, via an application interface ("I/F") line 151. In some embodiments, the processing device may also be coupled to an embedded controller 154 to communicate with the external components, such as a host 150. In some embodiments, the processing device 110 is configured to communicate with the embedded controller 154 or the host 150 to send and/or receive data.

The processing device 110 may reside on a common carrier substrate such as an integrated circuit ("IC") die substrate, a multi-chip module substrate, or the like. In some embodiments, the components of the processing device 110 are one or more separate integrated circuits and/or discrete components. In some embodiments, the processing device 110 comprises one or more other processing devices, as known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is also noted that the embodiments described herein are not limited to having a configuration of a processing device coupled to an application processor, but may include a system that measures the capacitance on the capacitive sense array and sends the raw data to a host computer 150 where it is analyzed by an application. In effect, the processing that is done by the processing device 110 may also be done in the application processor. Specifically, in some embodiments, instead of performing the operations of the processing core 109 in the processing device 110, the processing device 110 may send the raw data or partially-processed data to the host 150. The host 150, as illustrated in FIG. 1, may include decision logic 153 that performs some or all of the operations of the processing core 109. Operations of the decision logic 153 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing core 109 may be implemented in the decision logic 153, the applications 152, or in other hardware, software, and/or firmware external to the processing device 110. In some other embodiments, the processing device 110 is the host 150.

The capacitance sense circuit 101 may be integrated into the IC of the processing device 110, or in a separate IC. In some embodiments, descriptions of capacitance sense circuit 101 may be generated and compiled for incorporation into other integrated circuits. For example, behavioral level code describing the capacitance sense circuit 101, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout and stored to a machine-accessible medium. The behavioral level code, the RTL code, the netlist, and the circuit layout may represent various levels of abstraction to describe the capacitance sense circuit 101.

It is noted that the components of the electronic system 100 may include all of the components described above. In some embodiments, the electronic system 100 includes fewer than all of the components described above.

In some embodiments, the electronic system 100 is used in a tablet computer. In some embodiments, the electronic system 100 is used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. Embodiments can be used in other capacitive sensing devices, such as a touch-sensor slider (not shown) or touch-sensor buttons (e.g., capacitance sensing buttons). In some embodiments, these sensing devices include one or more capacitive sensors or other types of capacitance-sensing circuitry. The operations described herein are not limited to notebook pointer operations, but can include other operations, such as lighting control (dimmer), volume control, graphic equalizer control, speed control, or other control operations requiring gradual or discrete adjustments. It should also be noted that these capacitive sensing embodiments may be used in conjunction with non-capacitive sensing elements, including pick buttons, sliders (e.g., display brightness and contrast), scroll-wheels, multi-media control (e.g., volume or track advance), handwriting recognition, and numeric keypad operation.

In some embodiments, the electronic system 100 further includes one or more alternative sense elements configured to communicate with the processing device 110 via a bus. Each alternative sense element is optionally a capacitance-based sensor or a non-capacitance-based sensor. Example alternative sense elements 156 include an ambient light sensor, a capacitive touch button, and a side touch sensor.

Figure 2:
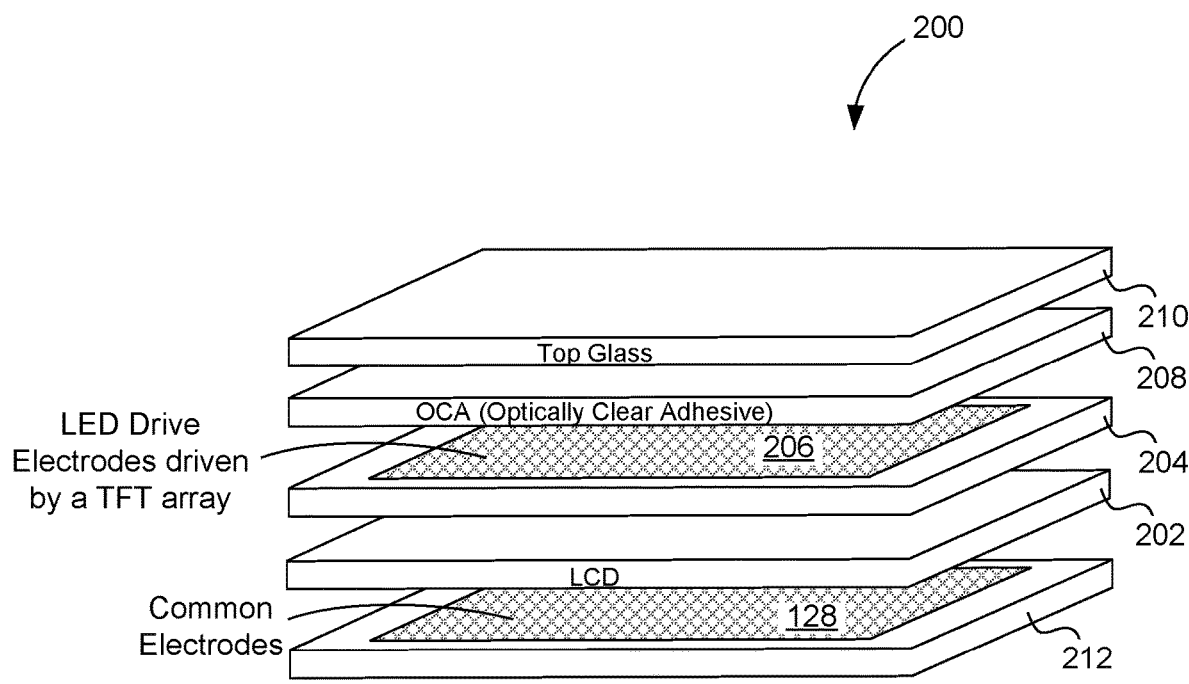
FIG. 2 is an exploded view of an integrated display screen (e.g., a liquid crystal display screen) of the electronic device in FIG. 1, including a plurality of structural layers, in accordance with some embodiments.
Figure 3:
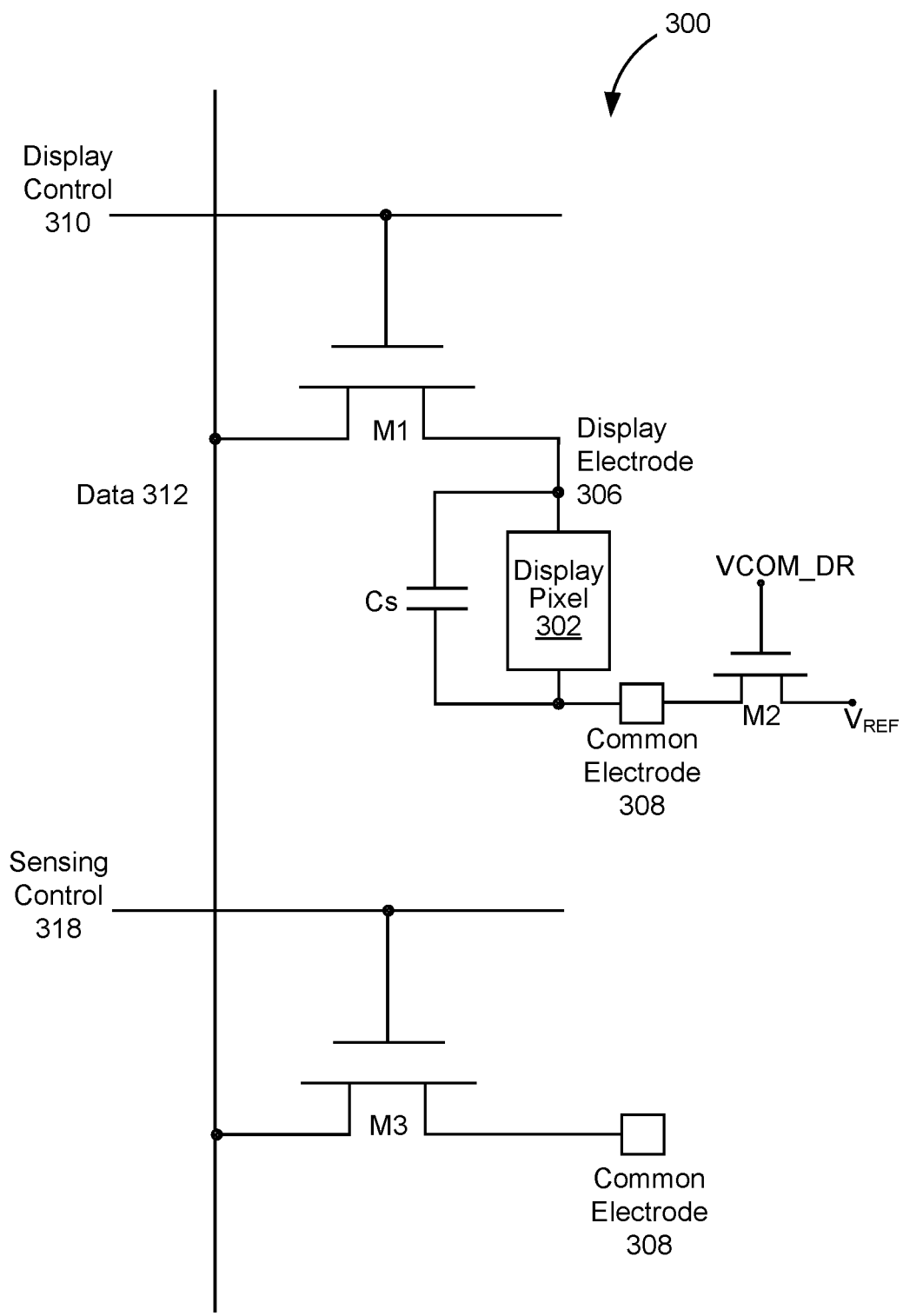
FIG. 3 is an example circuit diagram for an interface circuit configured to drive a display element and monitor a touch sensing element of the integrated display screen, in accordance with some embodiments.

FIG. 2 is an exploded view of an integrated display screen 200 (e.g., a liquid crystal display screen) of the electronic device in FIG. 1, including a plurality of structural layers in accordance with some embodiments. FIG. 3 is an example circuit diagram for an interface circuit 300 configured to drive a display element and monitor a touch sensing element of the integrated display screen 200 in accordance with some embodiments. The integrated display screen 200 includes a common electrode layer that is used to drive display pixels of the display device 125 and reconfigured as a capacitive sense array 128 in accordance with some embodiments. The integrated display screen 200 includes a liquid crystal display (LCD) 202 overlaid by a substrate 204 (optionally made of glass). A display electrode layer 206 is disposed on a surface of the substrate 204 to form a footprint of a two-dimensional array of display elements. Optionally, as shown in FIG. 2, the display electrode layer 206 is formed on a top surface of the substrate 204 that faces away from the LCD 202 or on a bottom surface of the substrate 204 that faces the LCD 202. The display electrode layer 206 includes a plurality of display electrodes for driving a plurality of display pixels made of LCD molecules of the LCD 202. Optically clear adhesive (OCA) 208 is used to bond a top glass 210 to the surface of the substrate 204 on which the display electrode layer 206 is constructed, thus protecting the display electrode layer 206. The integrated display screen 200 further includes a two-dimensional array of common electrodes 128 (i.e., a common electrode layer) opposing the plurality of display electrodes formed on the display electrode layer 206. Stated another way, the common electrode array 128 is formed on a substrate 212 that is disposed under the LCD 202 and opposes the substrate 204. As such, each display pixel of the LCD 202 is disposed between a respective display electrode and a respective common electrode that are formed on the display electrode layer 206 and the common electrode layer 128, respectively.

Alternatively, in some embodiments not shown in FIG. 2, the display electrode layer 206 is constructed on a surface of the substrate 204 to form a footprint of a display element array, and the substrate 204 is disposed under the LCD 202. The common electrode array 128 is formed on the substrate 212 (optionally made of glass). The substrate 212 is disposed above the LCD 202 and opposes the substrate 204. The top glass 210 is bonded to the substrate 212 using the OCA 208 for protecting the common electrode layer 128. Each display pixel of the LCD 202 is still disposed between a respective display electrode and a respective common electrode, which are formed on the display electrode layer 206 and the common electrode layer 128, respectively.

In some embodiments, a first thin film transistor (TFT) array is formed on the substrate 204 to drive the display electrodes formed on the display electrode layer 206. More specifically, a gate layer, a semiconductor layer, a source/drain layer, one or more conductive layers and one or more intervening insulating layers are deposited on the substrate 204. These material layers are lithographically patterned on the substrate 204 to form functional parts (e.g., gate, source, and drain) of the TFTs as well as the row and column lines of the first TFT array. For each individual display pixel of the LCD 202, the respective display electrode is electrically coupled to a respective TFT (M1) of the first TFT array. The first TFT array is configured to receive display driving signals from the processing device 110 (more specifically, the pixel drive circuit 102 of the processing device 110), and generates a first electrical voltage or current to drive the display electrode of each display pixel. As the first electrical voltage or current is applied to the liquid crystal molecules corresponding to each display pixel, the molecules tend to untwist from their original twisted form, and cause a change in the angle of incident light. That is, the first TFT array includes a two dimensional (2D) array of TFTs, including row lines and column lines. Referring to FIG. 3, each TFT (M1) of the first TFT array is connected between a respective row line and a respective column line, and configured to provide the first electrical voltage or current to drive the corresponding liquid crystal molecules of the corresponding display pixel or element.

In some embodiments, the entire common electrode layer 128 is electrically coupled to a reference voltage (sometimes referred to as VCOM), while each TFT (M1) of the first TFT array is coupled to the first electrical voltage or current to drive the corresponding display pixel or element. In some embodiments, the common electrodes 128 corresponding to the display pixels are driven individually or in a group while each TFT (M1) of the first TFT array is coupled to the first electrical voltage or current to drive the display electrode of the corresponding display pixel or element.

Specifically, in some embodiments, a second transistor array is applied to drive the common electrode array 128 while the first TFT array is applied to drive the display electrode layer 206 in the display driving state. A gate layer, a semiconductor layer, a source/drain layer, one or more conductive layers, and one or more intervening insulating layers are deposited and lithographically patterned to form functional parts (e.g., gate, source and drain) of the second transistor array. Each common electrode is electrically coupled to a respective transistor (M2) of the second transistor array. The second transistor array is configured to receive display driving signals from the processing device 110, and generates a second electrical voltage or current (e.g., the reference voltage) to drive the common electrode corresponding to each display pixel. As the first and second electrical voltages/currents are applied to the liquid crystal molecules corresponding to each display pixel, the molecules tend to untwist from their original twisted form, and cause a change in the angle of incident light.

In some embodiments, the second transistor array includes a two dimensional (2D) array of transistors (M2), each of which is a thin film transistor located locally on a respective common electrode. Each transistor (M2) of the second transistor array is connected between a respective row line and a respective column line, and configured to provide the second electrical voltage or current to drive the corresponding liquid crystal molecules of the corresponding display pixel (e.g., the reference voltage) in conjunction with the first electrical voltage or current in the display driving state. Alternatively, in some embodiments, the second transistor array is located outside a footprint of the display electrode layer 206 and configured to access the common electrodes via interconnects disposed on top of the common electrodes. The second transistor array located external to the common electrodes includes a plurality of metal-oxide-semiconductor field-effect transistors (MOSFETs) distinct from TFTs.

In some embodiments, the common electrodes 128, the display electrodes, the first TFT array and the second transistor array (if formed locally) are made of transparent material (e.g., indium-tin oxide (ITO)) to allow light to pass through from the side or the back of the integrated display screen 200.

Figure 5A:
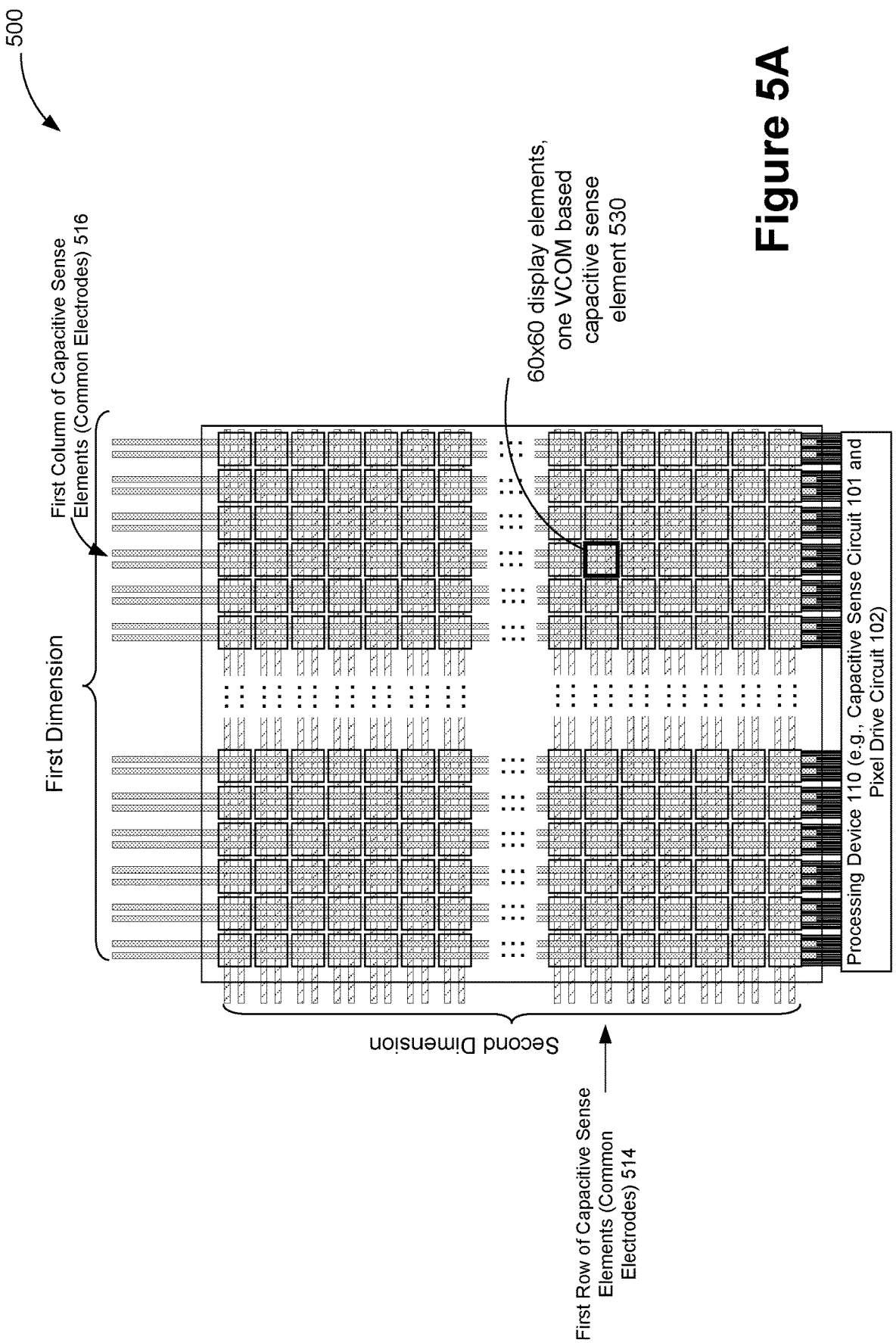
FIG. 5A is a top view of an example integrated display screen of an electronic device having a 2D array of display elements and a 2D array of capacitive sense elements, in accordance with some embodiments.
Figure 6A:
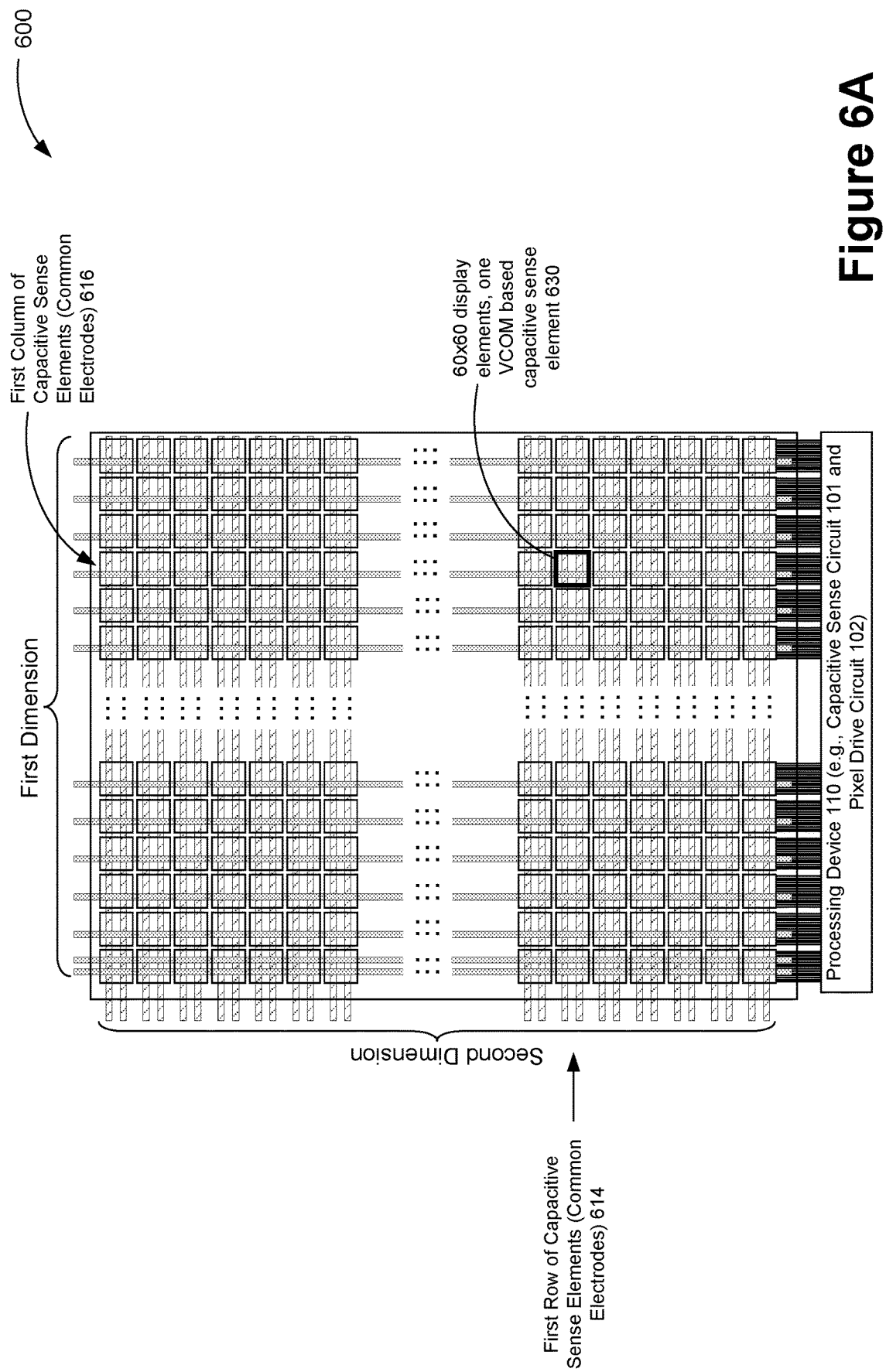
FIG. 6A is a top view of another example integrated display screen of an electronic device having a 2D array of display elements and a 2D array of capacitive sense elements, in accordance with some embodiments.
Figure 7A:
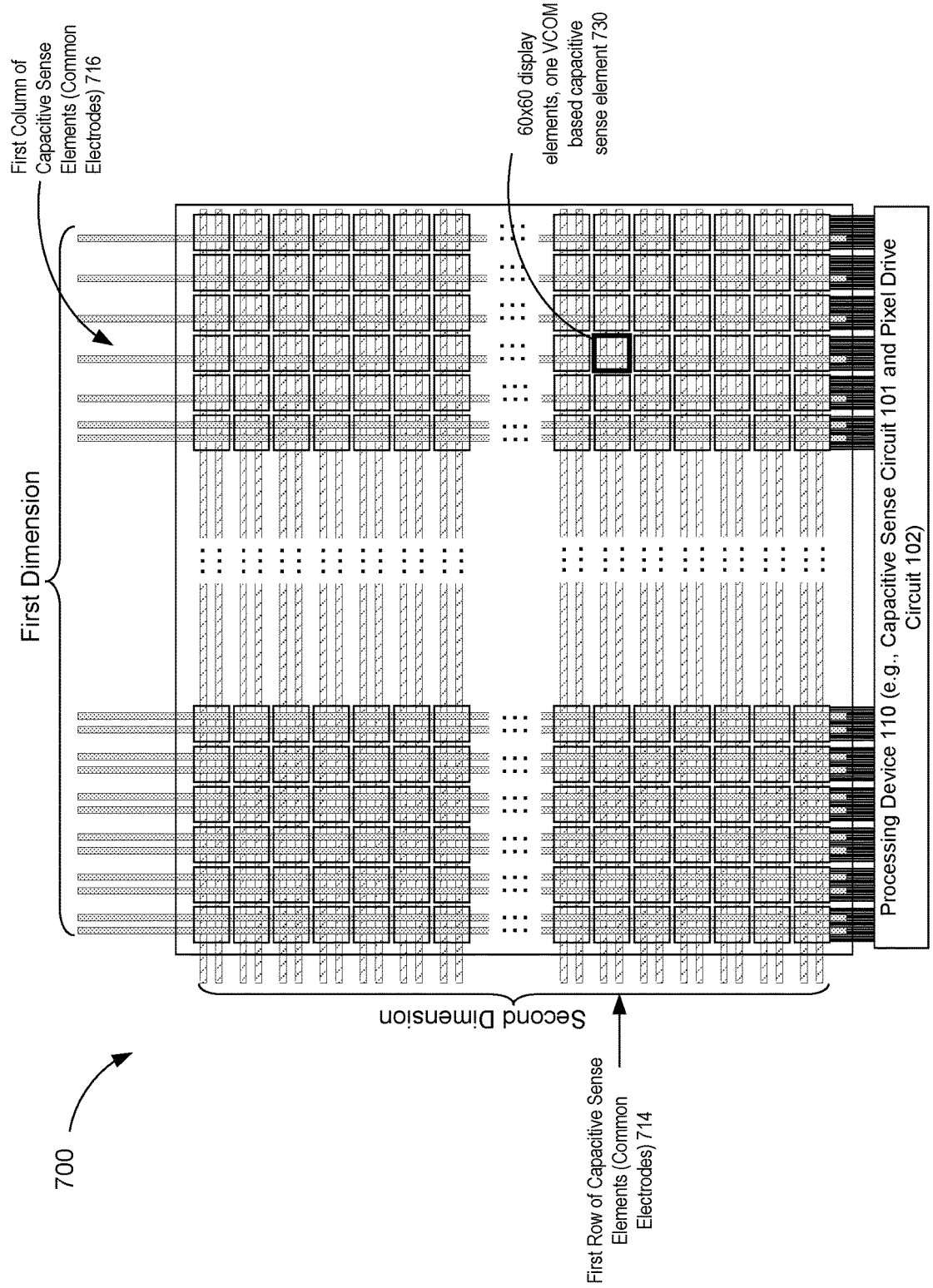
FIG. 7A is a top view of another example integrated display screen of an electronic device having a landscape orientation, in accordance with some embodiments. The integrated display screen combines a 2D array of display elements and a 2D array of capacitive sense elements.

In some embodiments, the common electrode array 128 has a diamond pattern or a row-column pattern (e.g., a two-dimensional (2D) array of common electrodes as shown in FIGS. 5A, 6A, and 7A). In some embodiments related to the row-column pattern, the capacitive sense array 128 reconfigured from the common electrode array 128 includes row and column sense elements that can be expressed as a matrix of the intersections between rows and columns. In some embodiments, the 2D array of common electrodes includes a plurality of square or rectangular electrodes, and when reconfigured to the capacitive sense array 128, a set of adjacent common electrodes (e.g., a 2D array of 60×60 common electrodes) is grouped into a unit capacitive sense element for touch detection. The 2D array of common electrodes can be divided to sets of adjacent common electrodes, each set of which is a unit capacitive sense element. Each unit capacitive sense element is addressed individually and independently for touch detection. In the display driving mode, each unit capacitive sense element also needs to be addressed individually and independently, although all unit capacitive sense elements are electrically coupled to the same reference voltage. This arrangement ensures that each unit capacitive sense element is addressed individually and independently for touch detection.

The resolution of the common electrodes 128 is represented as the product of the number of rows and the number of columns associated with the common electrodes 128. The resolution of the reconfigured capacitive sense array 128 is represented as the product of the number of rows and the number of columns associated with the capacitive sense elements. The resolutions of the common electrodes 128 and the reconfigured capacitive sense array 128 can be identical or distinct.

Referring to FIG. 3, each display pixel 302 is disposed between a display electrode 306 and a common electrode 308. The first TFT (M1) is connected between a respective display control interconnect 310 (i.e., data control line 310) and a respective data interconnect 312, and configured to provide the first electrical signal to drive a display electrode 306 of the display pixel 302. The display pixel 302 also corresponds to a second transistor (M2) to provide a second electrical signal to drive the common electrode 308. For example, in the display driving state, the common electrode 308 is coupled to the ground (e.g., 0V) or another reference voltage (e.g., 2V or −2V). The display control interconnect 310 is coupled to a TFT turn-on voltage $V_{GH}$ (e.g., 13V) to turn on the first TFT (M1), such that the display electrode 306 is electrically driven by an electrical signal delivered to a source of the first TFT (M1) via the data interconnect 312. In some embodiments, the electrical signal at the source has a magnitude of +5V or −5V, and the first electrical signal applied on the display electrode 306 tracks the electrical signal applied at the source. In another example, the common electrode 308 is coupled to the ground (e.g., 0V). The display control interconnect 310 is coupled to a TFT turn-off voltage $V_{GL}$ (e.g., −10V) to turn off the first TFT (M1), such that the display electrode 306 is electrically decoupled from the electrical signal delivered to the source of the TFT (M1). Regardless of the magnitude of the electrical signal at the source of the first TFT (M1), the first electrical signal at the display electrode 306 does not track the electrical signal of the source. In other words, when the first TFT (M1) is turned off, the data interconnect 312 can be used for touch detection without impacting display operation of the display pixel 302.

In some embodiments, each common electrode 308 is further coupled to a third TFT (M3) (specifically, the source of the third TFT (M3)) for touch detection. The gate of the third TFT (M3) is coupled to a sensing control interconnect 318, and the source of the third TFT (M3) is coupled to the data interconnect 312. In the touch sensing state, the display control interconnect 310 is disabled, such that the display electrode 306 is decoupled from the data interconnect 312. The common electrode 308 is also decoupled from the reference voltage (e.g., 2V, 0, or −2V). The sensing control interconnect 318 is coupled to a TFT turn-on voltage $V_{GH}$ to turn on the third TFT (M3). The common electrode 308 is electrically coupled to the data interconnect 312 via the third TFT (M3), and the data interconnect 312 is coupled to the capacitance sense circuit 101 to monitor a self-capacitance of the common electrode 308 and detect touch events based on a variation of the monitored self-capacitance.

Each common electrode 308 corresponds to at least one third TFT (M3). When each common electrode 308 corresponds to more than one display electrode 306, a single third TFT (M3) or more than one third TFT (M3) can be formed on the display pixels 302 associated with the respective common electrode. In some embodiments, a single third TFT (M3) is formed on each display pixel 302. In some embodiments, third TFTs (M3) are formed on a subset of display pixels 302, and no third TFT (M3) is formed on a subset of remaining display pixels 302 associated with the same common electrode. In some embodiments, more than one third TFT (M3) is formed on display pixels 302 associated with one common electrode, and couples multiple data interconnects and sensing control interconnects 318 interconnects to drive the associated common electrode. In this way, parasitic resistance to access the common electrode is reduced in the touch sensing mode, and a corresponding scan rate of the capacitive sense elements is enhanced.

Figure 4:
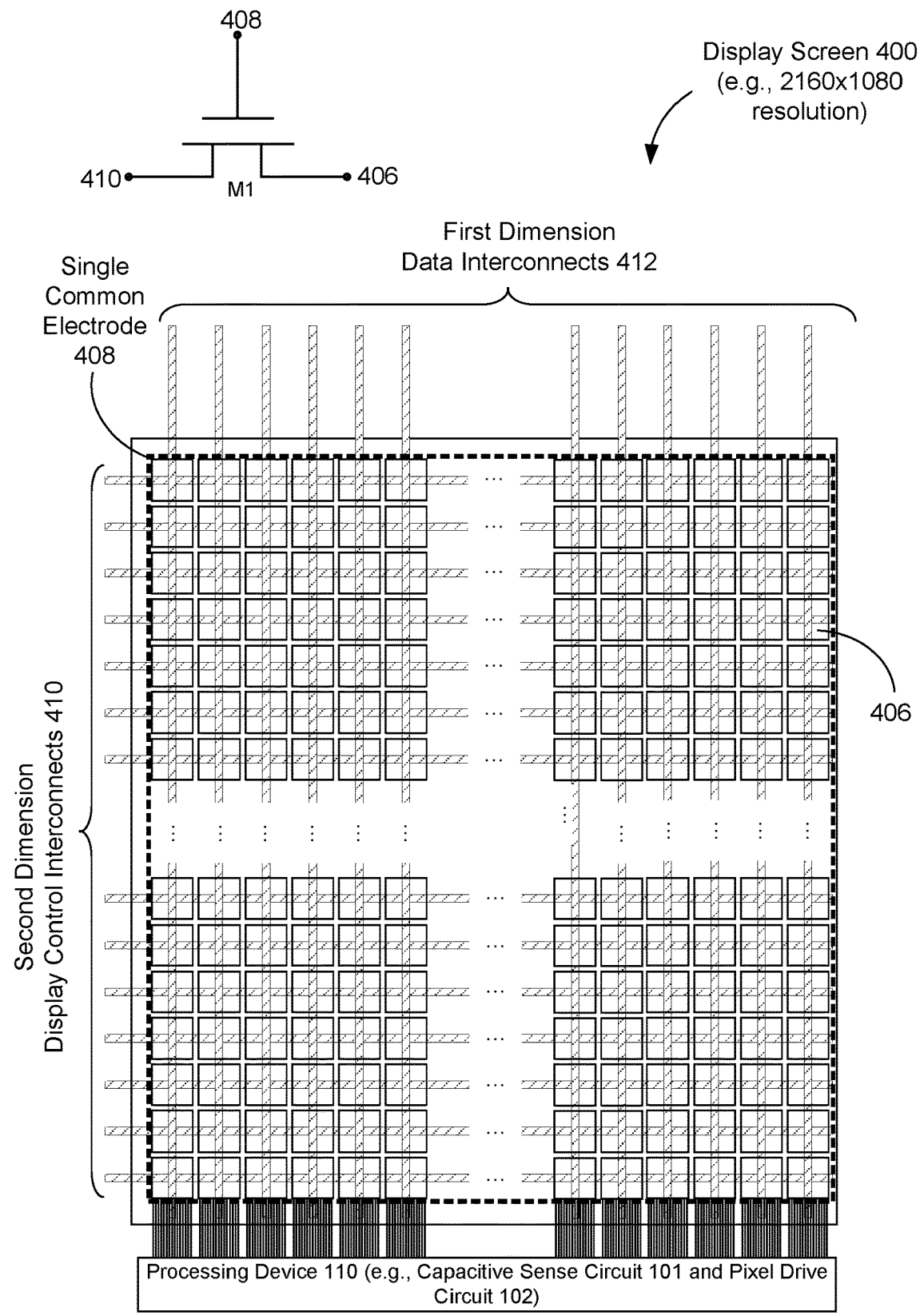
FIG. 4 is a top view of an example two-dimensional (2D) array of display elements in a display screen of an electronic device.

FIG. 4 is a top view of an example two-dimensional (2D) array of display elements in a display screen 400 of an electronic device. Each display element in the display element array includes a respective display electrode 406 located in a display electrode layer (e.g., layer 206 in FIG. 2) and a respective common electrode 408 located in a common electrode layer (e.g., layer 128 in FIG. 2). The display screen 400 has a resolution of m×n. The display electrode layer includes a 2D array of display electrodes having m rows and n columns of display electrodes 406. The common electrode layer includes a single common electrode 408 or a set of common electrodes 408 that are electrically coupled (e.g., shorted) to each other corresponding to the entire 2D array of display electrodes.

The display screen 400 further includes a plurality of display control interconnects 410 and a plurality of data interconnects 412, both of which are arranged on top of the display element array. In some embodiments, each display control interconnect 410 is aligned with a respective row of the m rows of display electrodes 406, and is configured to provide a display control signal to enable/disable electrical access to display electrodes in the respective row via first TFTs (M1). Each data interconnect 412 is aligned with a respective column of the n columns of display electrodes, and is electrically coupled to display electrodes in the respective column via the first TFTs (M1). Alternatively, in some embodiments, each display control interconnect 410 is aligned with a respective column of the n columns of display electrodes, and is configured to provide a display control signal to enable/disable electrical access to display electrodes in the respective column via the first TFTs (M1), and each data interconnect 412 is aligned with a respective row of the m rows of display electrodes 406, and is electrically coupled to display electrodes in the respective row electrodes 406 via the first TFTs (M1).

The display screen 400 further includes a plurality of first TFTs (M1). Each first TFT (M1) corresponds to a respective display electrode 408, a respective one of the plurality of data interconnects 412, and a respective one of the plurality of display control interconnects 410, which are electrically coupled to the drain, the source, and the gate of the respective first TFT (M1). Each of the plurality of first TFTs (M1) is configured to be turned on by the respective one of the plurality of display control interconnects 410, allowing data provided by the respective one of the plurality of data interconnects 412 to be written into and drive the respective display electrode 406. While each first TFT (M1) is turned on to drive the respective display electrode 408, the common electrode 408 is electrically coupled to and driven by a reference voltage. In some situations, the single common electrode 408 is grounded for the purposes of driving the display element array.

Figure 5B:
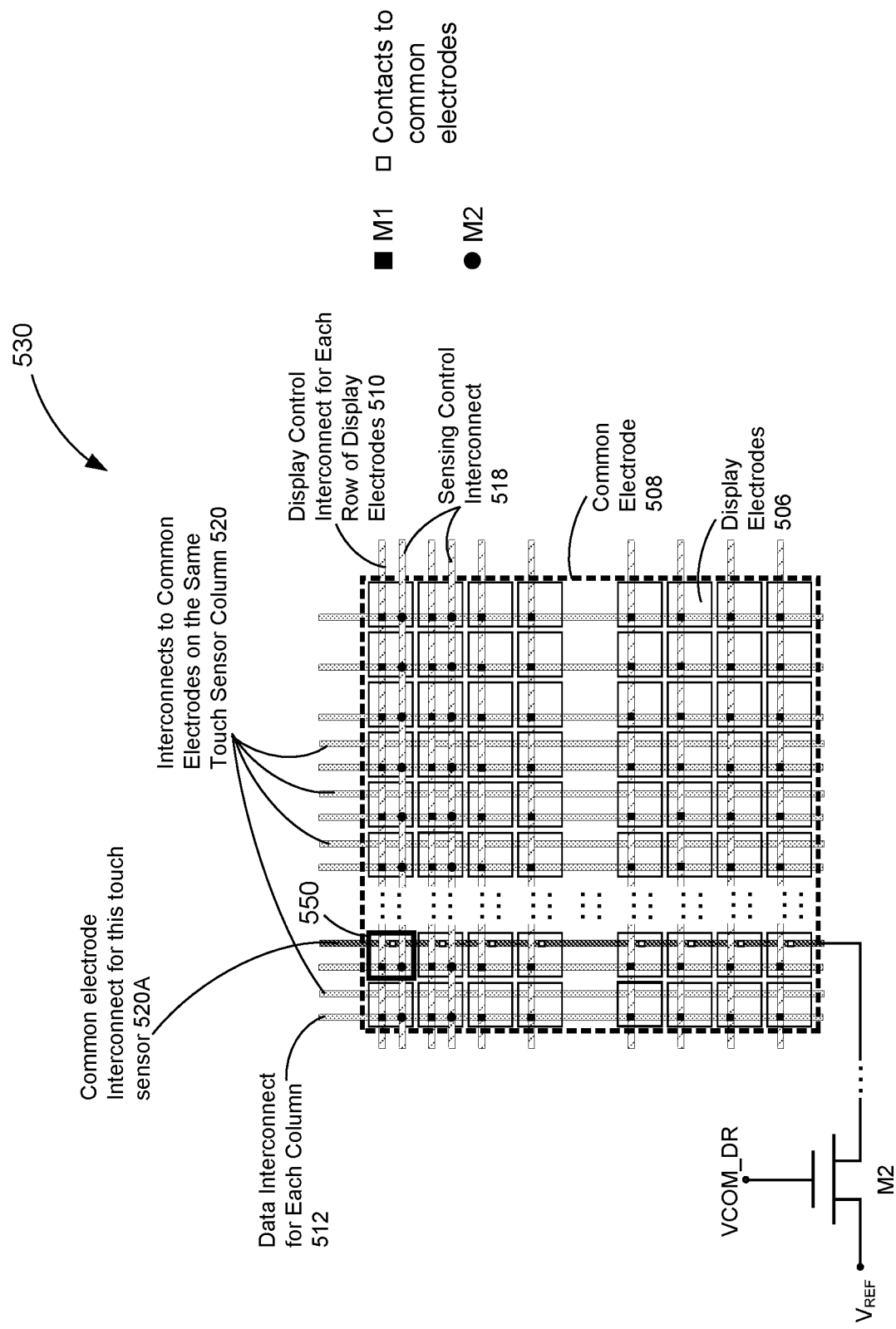
FIG. 5B is a top view of a unit 530 of an integrated display screen having a 2D subarray of display elements and a single capacitive sense element, in accordance with some embodiments.
Figure 5C:
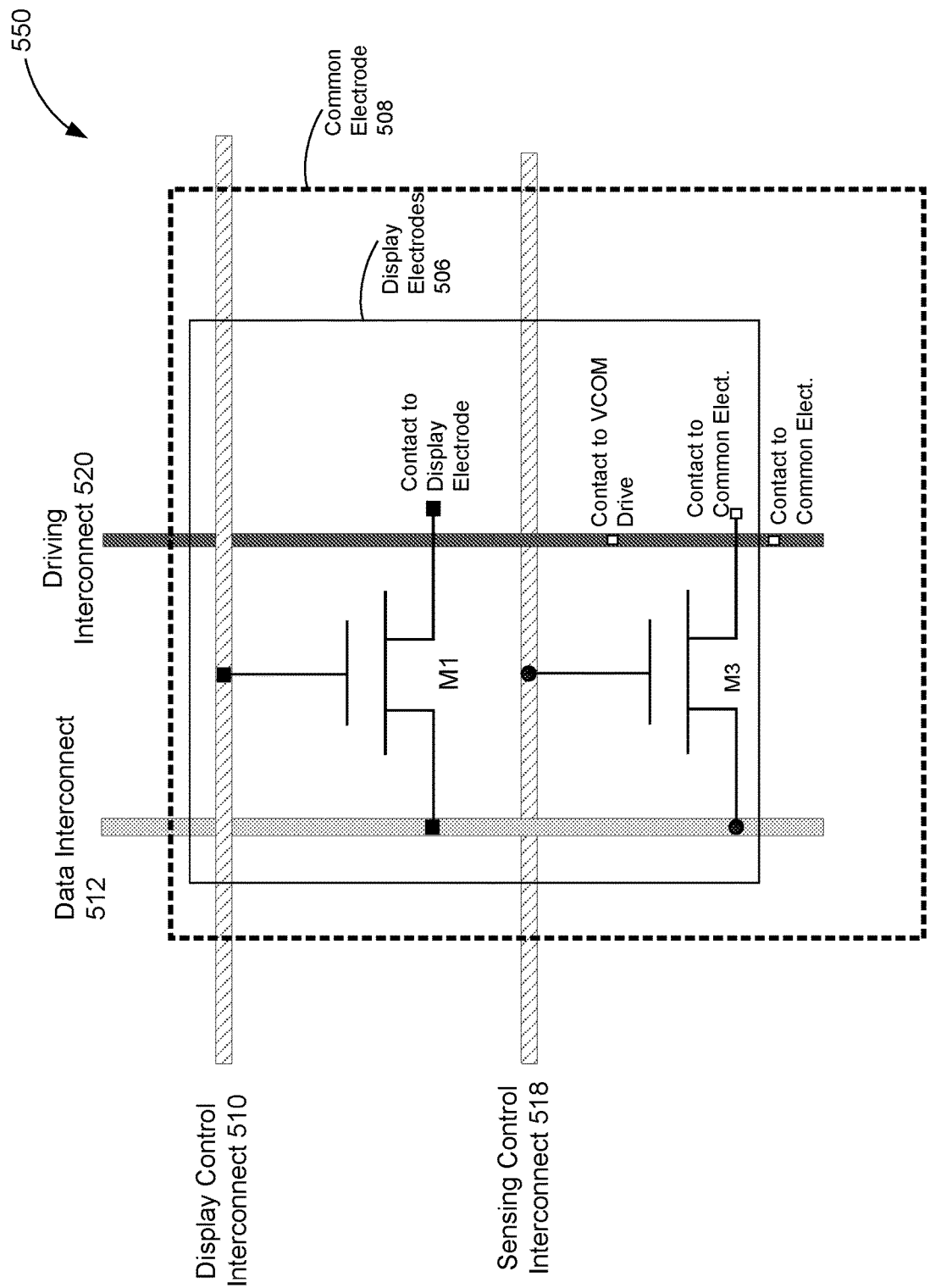
FIG. 5C is a circuit diagram of an interface circuit configured to drive a single display element in the 2D subarray of display elements and the single capacitive sense element in FIG. 5B, in accordance with some embodiments.

FIG. 5A is a top view of an example integrated display screen 500 of an electronic device having a 2D array of display elements and a 2D array of capacitive sense elements in accordance with some embodiments. FIG. 5B is a top view of a unit 530 of an integrated display screen 500 having a 2D subarray of display elements and a single capacitive sense element in accordance with some embodiments. FIG. 5C is a circuit diagram of an interface circuit 550 configured to drive a single display element in the 2D subarray of display elements and the single capacitive sense element in FIG. 5B in accordance with some embodiments. The integrated display screen 500 is made by integrating the 2D array of capacitive sense elements into the display screen 400. Each display element in the display element array includes a respective display electrode 506 located in a display electrode layer (e.g., layer 206 in FIG. 2) and a respective common electrode 508 located in a common electrode layer (e.g., layer 128 in FIG. 2). The display screen 500 has a resolution of m×n, and the display electrode layer includes a 2D array of display electrodes 506 having m rows and n columns of display electrodes 506. The integrated display screen 500 further includes a plurality of display control interconnects 510 and a plurality of data interconnects 512, both of which are arranged on top of the display element array. Each display element is located at an intersection of a respective display control interconnect 510 and a respective data interconnect 512.

Unlike the display screen 400, which has a single common electrode 408, this integrated display screen 500 has a two-dimensional array of common electrodes 508, which are used as the 2D array of capacitive sense elements. The 2D array of display elements is formed based on the 2D array of common electrodes, and each capacitive sense element includes a distinct one of the common electrodes 508 of the display element array. The 2D array of capacitive sense elements has a resolution of k×l. In some embodiments, the resolution of the capacitive sense element array is smaller than the display element array. Referring to FIG. 5B, a single capacitive sense element corresponds to the subarray of display elements having m/k rows and n/l columns in each unit 530 of the integrated display screen 500, and a single common electrode 508 is shared by the single capacitive sense element and the subarray of display elements. In some embodiments, the single common electrode 508 includes a plurality of common electrodes that are coupled to each other and jointly controlled for display and touch sensing functions.

The unit 530 is located at an intersection of a first row 514 and a first column 516 of the capacitive sense element array. The integrated display screen 500 further includes at least one sensing control interconnect 518 arranged on top of the first row 514 of the k rows of common electrodes. The at least one sensing control interconnect 518 is configured to provide a touch sensing control signal to enable/disable electrical access to common electrodes in the first row 514 of common electrodes. For example, each of the l common electrodes in the first row 514 corresponds to one or more third TFTs (M3). A third TFT (M3) is placed at an intersection of the at least one sensing control interconnect 518 and a data interconnect 512 corresponding to the respective common electrode. The gate of the third TFT (M3) is controlled by the at least one sensing control interconnect 518 to couple the common electrode 508 (which is connected to the drain of M3) to the data interconnect 512 (which is connected to a source of M3). A capacitive sense signal is read from the data interconnect 512 to monitor the self-capacitance of the common electrode 508 of the unit 530 and detect touch events based on a variation of the monitored self-capacitance.

In some embodiments, each unit 530 has more than one sensing control interconnect 518 and a plurality of third TFTs (M3). Each third TFT (M3) is placed at an intersection of one of the sensing control interconnects 518 and one of a set of data interconnects 512 corresponding to the respective common electrode 508. Each sensing control interconnect 518 is configured to provide a touch sensing control signal to enable/disable electrical access to the respective common electrode 508 in the first row 514 of common electrodes.

In some embodiments, the integrated display screen 500 includes a plurality of driving interconnects 520 arranged on top of the first column 516 of common electrodes and in parallel with the plurality of data interconnects 512. Each common electrode 508 in the first column 516 of common electrodes is electrically coupled to at least one driving interconnect of the plurality of driving interconnects 520. Each of the plurality of driving interconnects 520 is electrically coupled to only one common electrode 508, so that the common electrodes can be individually and independently addressed for touch sensing. Each of the plurality of driving interconnects 520 is further coupled to a second transistor (M2) located at an end of the respective driving interconnect 520. In a display driving mode, the second transistor (M2) is configured to be turned on, allowing the respective common electrode to be coupled to and driven by a reference voltage (e.g., a ground voltage).

In some embodiments, multiple driving interconnects 520 need to pass each common electrode in the first column 516 in order to address all common electrodes in the first column 516 in the display driving mode. For example, the display element array has 2160 rows and 1080 columns, and the capacitive sense element array has 36 rows and 18 columns. Each subarray of the capacitive sense element 530 corresponds to 60 rows and 60 columns of display electrodes 506. The integrated display screen 500 must include at least 36 driving interconnects 520 to provide one driving interconnect to common electrodes in the first column 516 of common electrodes. For example, each display element corresponds to at most two interconnects aligned with a column of the display element array, and one of the two interconnects is reserved as a data interconnect 512. Each display element corresponds to one more interconnect to be used as a driving interconnect 520, and the first column 516 corresponds to at most 60 driving interconnects to be used as driving interconnects 520. As a result, the 36 common electrodes in the first column 516 share at most 60 driving interconnects, and not every common electrode can be accessed by two driving interconnects.

In some embodiments, the integrated display screen 500 has a portrait orientation, i.e., has a first dimension and a second dimension greater than the first dimension. The capacitance sense circuit 101 and the pixel drive circuit 102 are disposed near a bottom side of the integrated display screen 500. The display driving interconnects 520 are arranged along the second dimension to couple to the pixel drive circuit 102. The driving interconnects 520 are arranged along a larger dimension of the integrated display screen 500, but can only provide less than 2 driving interconnects on average for each common electrode of the integrated display screen 500 in the display driving mode. Similarly, in some other embodiments (not shown in FIG. 5A), the integrated display screen 500 has a landscape orientation, i.e., has a first dimension and a second dimension smaller than the first dimension, and the capacitance sense circuit 101 and the pixel drive circuit 102 is disposed near a bottom side of the integrated display screen 500. When the driving interconnects 520 are arranged along the first dimension (i.e., the larger dimension) of the integrated display screen 500, each common electrode is driven by less than 2 driving interconnects on average in the display driving mode.

Figure 6B:
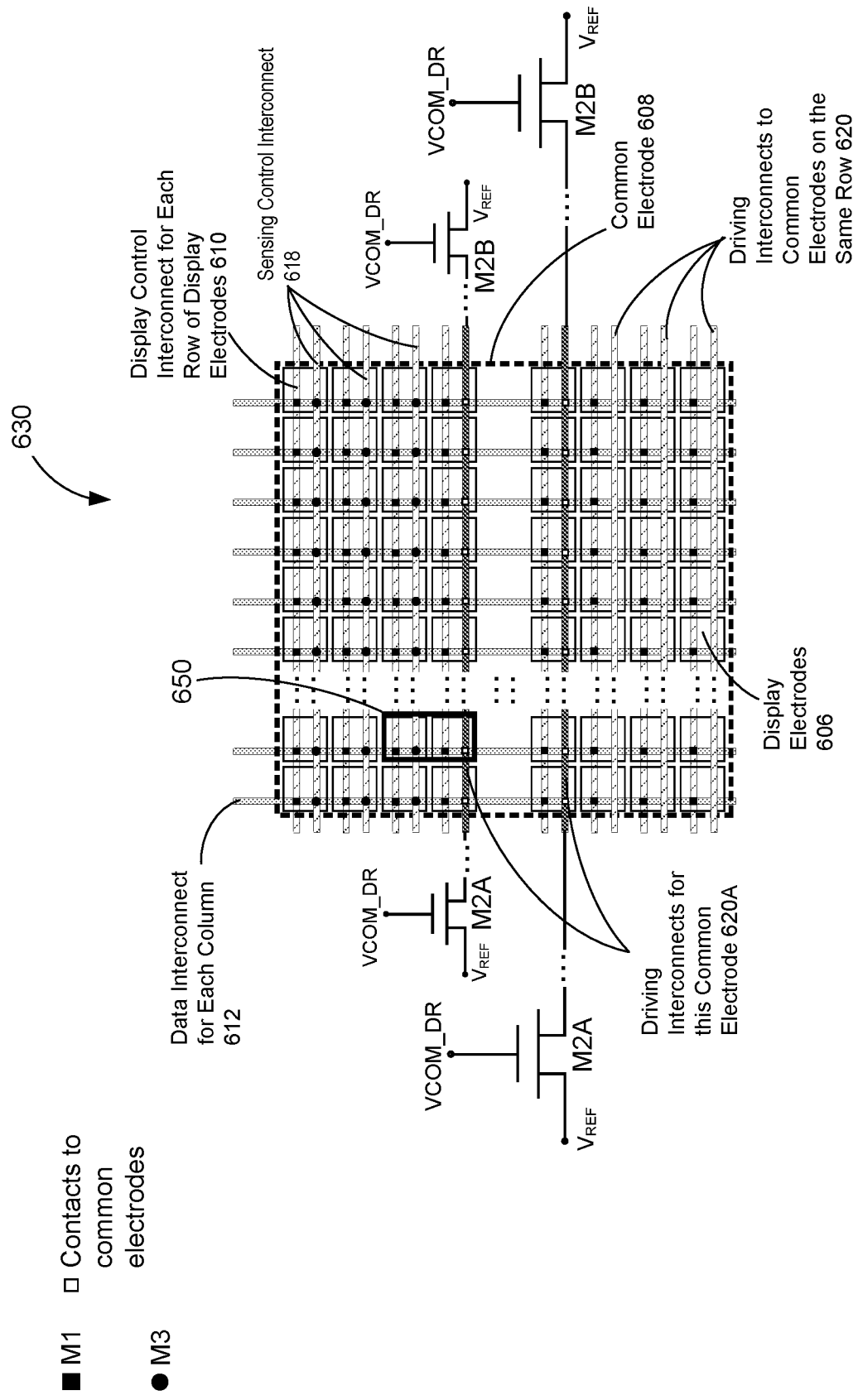
FIG. 6B is a top view of a unit of another integrated display screen having a 2D subarray of display elements and a single capacitive sense element, in accordance with some embodiments.
Figure 6C:
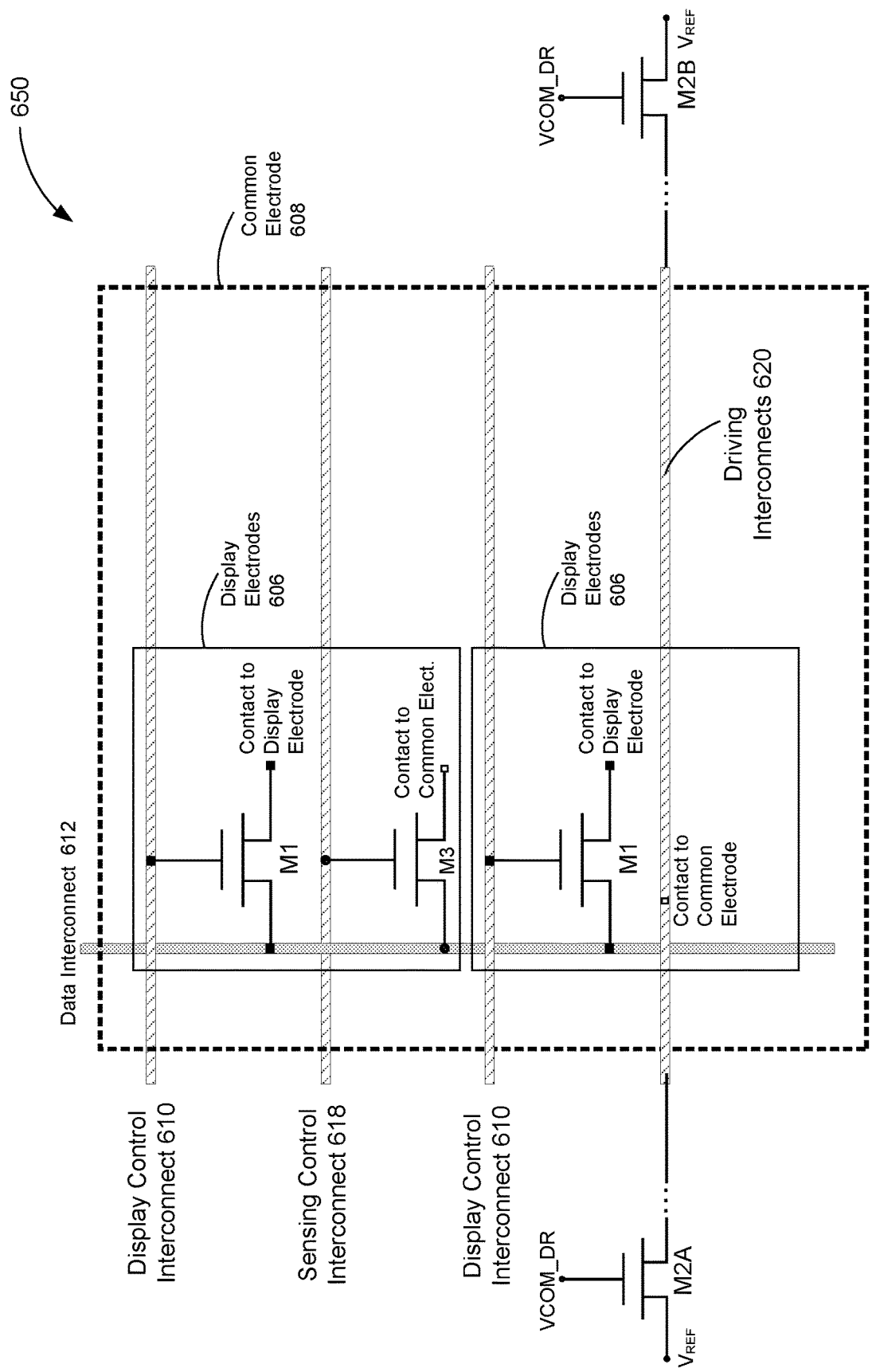
FIG. 6C is a circuit diagram of an interface circuit configured to drive a single display element in the 2D subarray of display elements and the single capacitive sense element in FIG. 6B, in accordance with some embodiments.

FIG. 6A is a top view of another example integrated display screen 600 of an electronic device having a 2D array of display elements and a 2D array of capacitive sense elements in accordance with some embodiments. FIG. 6B is a top view of a unit 630 of another integrated display screen 600 having a 2D subarray of display elements and a single capacitive sense element in accordance with some embodiments. FIG. 6C is a circuit diagram of an interface circuit 650 configured to drive a single display element in the 2D subarray of display elements and the single capacitive sense element in FIG. 6B in accordance with some embodiments. Driving interconnects 620 are arranged to provide two or more driving interconnect 620 for each common electrode 608 in the array of capacitive sense elements. Each driving interconnect 620 extends along a shorter dimension of the integrated display screen 600 and is driven by one or more second transistors (M2) from one or both ends of the respective driving interconnect 620. As such, parasitic resistance associated with each driving interconnect 620 is reduced in the integrated display screen 600, thereby enhancing a rate of driving the corresponding display element array in a display driving mode.

Specifically, the 2D array of display elements is formed between a display electrode layer (e.g., layer 206 in FIG. 2) and a common electrode layer (e.g., layer 128 in FIG. 2). The display electrode layer includes a 2D array of display electrodes 606 having m rows and n columns of display electrodes, and the common electrode layer includes a 2D array of common electrodes 608 having k rows and l columns of common electrodes. In the 2D array of capacitive sense elements, each capacitive sense element includes a distinct one of the common electrodes of the 2D array of display elements. Referring to FIG. 6B, in some embodiments, a unit 630 of the integrated display screen 600 corresponds to a common electrode 608, which is optionally a single electrode or a set of electrodes that are electrically connected to each other. The integrated display screen 600 includes a plurality of display control interconnects 610 arranged on top of a first row 614 of common electrodes. Each display control interconnect 610 is configured to provide a display control signal to enable/disable electrical access to display electrodes 606 in a respective row of the m rows of display electrodes. Further, in some embodiments, the integrated display screen 600 further includes a plurality of data interconnects 612 arranged on top of a first column 616 of the l columns of common electrodes and perpendicular to the plurality of display control interconnects 610. Each of the plurality of data interconnects 612 is electrically coupled to display electrodes 606 in a respective column of the n columns of display electrodes.

The integrated display screen 600 further includes one or more sensing control interconnects 618 arranged on top of the first row 614 of the k rows of common electrodes. Each sensing control interconnect 618 is configured to provide a touch sensing control signal to enable/disable electrical access to common electrodes in the first row 614 of common electrodes 608 in a touch sensing mode. The integrated display screen 600 further includes a plurality of driving interconnects 620 arranged on top of the first row 614 of common electrodes and in parallel with the one or more sensing control interconnects 618. Each common electrode 608 in the first row 614 of common electrodes is electrically coupled to two or more respective driving interconnects 620 of the plurality of driving interconnects. Each of the plurality of driving interconnects 620 is electrically coupled to only one common electrode 608.

In some embodiments, the integrated display screen 600 further includes a first plurality of TFTs (M1). Each of the first plurality of TFTs (M1) corresponds to a respective display electrode 606, a respective one of the plurality of data interconnects 612, and a respective one of the plurality of display control interconnects 610, which are electrically coupled to the drain, the source, and the gate of the respective TFT (M1). In the display driving mode, one of the first plurality of TFTs (M1) is turned on by the respective one of the plurality of display control interconnects 610, allowing data provided by the respective one of the plurality of data interconnects 612 to be written into and drive the respective display electrode 606.

In the display driving mode, one of the plurality of driving interconnects 620A electrically couples the common electrode 608 corresponding to the display electrode 606 of the same display element to a reference voltage (e.g., a ground voltage). In some embodiments, a single second transistor (M2) is electrically coupled to and drives the driving interconnect 620A. In some embodiments, a transistor M2A is electrically coupled to a first end of the driving interconnect 620A, and another transistor M2B is electrically coupled to a second end of the driving interconnect 620A that is opposite to the first end. Alternatively, in some embodiments, a single transistor M2A is electrically coupled to first ends of two or more driving interconnects 620A coupled to the same common electrode 608, and another single transistor M2B is electrically coupled to second ends of the two or more driving interconnects 620A that are opposite to the first ends. The transistors M2A and M2B are configured to drive the driving interconnects 620A coupled to the same common electrode 608 simultaneously. The first and second transistors M2 are located next to the 2D array of display elements, e.g., within a bezel area of the integrated display screen 600.

Alternatively, the integrated display screen 600 further includes one or more third TFTs (M3). Each of the one or more third TFTs (M3) corresponds to a respective common electrode 608, a respective one of the plurality of data interconnects 612, and a respective one of the plurality of sensing control interconnects 618, which are electrically coupled to the source, the drain, and the gate of the respective third TFT (M3). In a touch sensing mode, one of the third TFTs (M3) is turned on by the respective one of the plurality of sensing control interconnects, allowing a signal at the respective common electrode 608 to be read to the respective one of the plurality of data interconnects 612. In some embodiments, a common electrode 608 is configured to be read via a plurality of third TFTs (M3), each of which is located at an intersection of a data interconnect 612 and a sensing control interconnect 618 corresponding to the common electrode 608.

Referring to FIG. 6B, in some embodiments, the first row 614 of common electrodes corresponds to m/k rows of display electrodes, and each row of the m/k rows of display electrodes 606 corresponds to (1) a respective display control interconnect 610 and (2) one of the driving interconnects 620 or one of the sensing control interconnects 618. On a device level, each of the k rows of common electrodes 608 corresponds to m/k rows of display electrodes 606 and up to 2 m/k interconnects extending along a first direction. The up to 2 m/k interconnects include m/k rows of display control interconnect 610 and two or more of the plurality of driving interconnects 620 for each of the 1 columns of common electrodes. Remaining interconnects of the 2 m/k interconnects are used to provide the one or more sensing control interconnects 618 to enable/disable the electrical access to the respective row of common electrodes 606. For example, the 2D array of display electrodes 606 has 2160 rows and 1080 columns of display electrodes, and the 2D array of common electrodes 608 has 36 rows and 18 columns of common electrodes that are aligned with the 2D array of display electrodes. Each common electrode 608 corresponds to 60×60 display electrodes 606. Each common electrode 608 corresponds to 60 display control interconnects 610, three driving interconnects 620 for each of 18 columns of common electrodes 608, and six sensing control interconnects 618, which are arranged along a first dimension of the integrated display screen 600. Each common electrode corresponds to 60 data interconnects that are arranged along a second dimension perpendicular to the first dimension of the integrated display screen 600. Thus, for the common electrode 608 shown in FIG. 6B, three driving interconnects 620A are electrically coupled to the common electrode 608 via contacts, while up to 51 driving interconnects 620 coupled to other common electrodes 608 in the first column 616 are disposed over the common electrode 608 shown in FIG. 6B.

Basically, the one or more sensing control interconnects 618 and the plurality of driving interconnects 620 extend along a first dimension of the integrated display device 600. The integrated display device 600 has a second dimension that is perpendicular to the first dimension. The capacitance sense circuit 101 and the pixel drive circuit 102 are disposed near a bottom side of the integrated display screen 600. In some embodiments shown in FIGS. 6A-6C, the integrated display device 600 has a portrait orientation, and the second dimension has a size greater than that of the first dimension. The driving interconnects 620 are thereby arranged along the shorter dimension of the integrated display screen 600, and provide two or more driving interconnects (which can be driven from both ends) for each common electrode of the integrated display screen 600 in the display driving mode. As a result, parasitic resistance associated with each driving interconnect 612 is reduced in the integrated display screen 600, thereby allowing the display element array 602 to be driven at an enhanced rate in the display driving mode.

Embodiments of this application drive each common electrode with more than one driving interconnect if possible. All common electrodes are accessed from one of two dimensions of an integrated display device in a display driving mode. Interconnects driving the common electrodes are arranged along a smaller dimension of the two dimensions to reduce resistance of each individual driving interconnect. Moreover, the larger dimension of the two dimensions can accommodate more interconnects, thereby allowing a larger number of driving interconnects to be assigned to each individual driving interconnect. Thus, arranging the driving interconnects along the small dimension of the two dimensions of the integrated display device helps reduce parasitic resistance of the driving interconnects by using more interconnects having shorter lengths to drive each individual common electrode. For these reasons, when the integrated display screen 600 has a portrait orientation as shown in FIG. 6A, the plurality of driving interconnects 620 are arranged along the first dimension, which has a smaller size than the second dimension, so that two or more driving interconnects 620 having a short length consistent with the size of the first dimension can be accommodated within the second dimension to access each common electrode 608.

It is noted that for the integrated display screen 600 having a portrait orientation, the driving interconnects 620 are arranged along the first dimension. In some embodiments as discussed above, the display control interconnects 610 and the sensing control interconnects 618 are also arranged along the first dimension, and the data interconnects 612 are arranged along the second dimension and perpendicular to the driving interconnects 620. Alternatively, in some embodiments not shown in FIGS. 6A and 6B, the driving interconnects 620 are arranged along the first dimension that is smaller than the second dimension. The data interconnects 612 are arranged along the first dimension and in parallel with the driving interconnects 620. The display control interconnects 610 and the sensing control interconnects 618 are arranged along the second dimension and perpendicular to the driving interconnects.

Figure 7B:
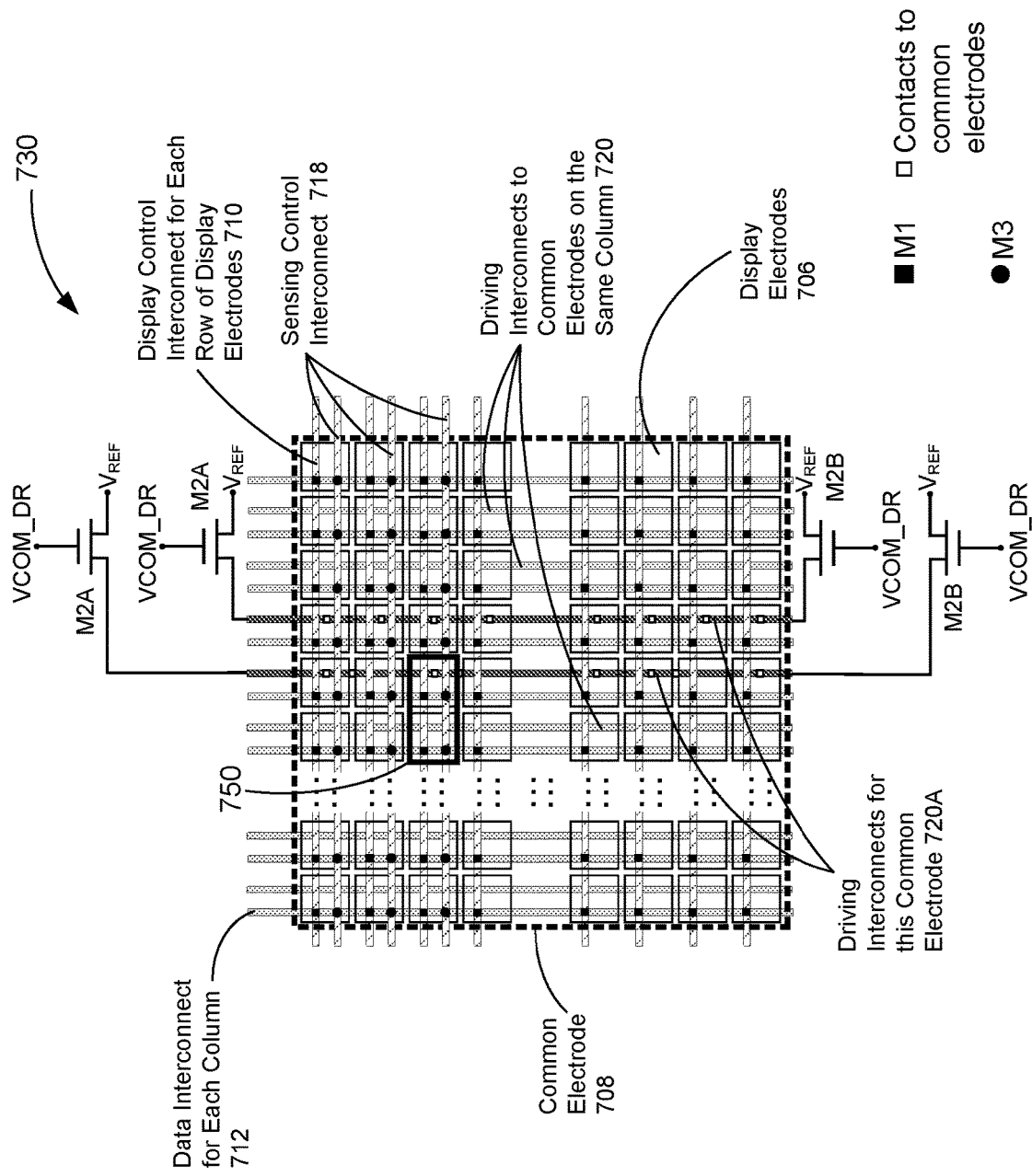
FIG. 7B is a top view of a unit of another integrated display screen having a 2D subarray of display elements and a single capacitive sense element, in accordance with some embodiments.
Figure 7C:
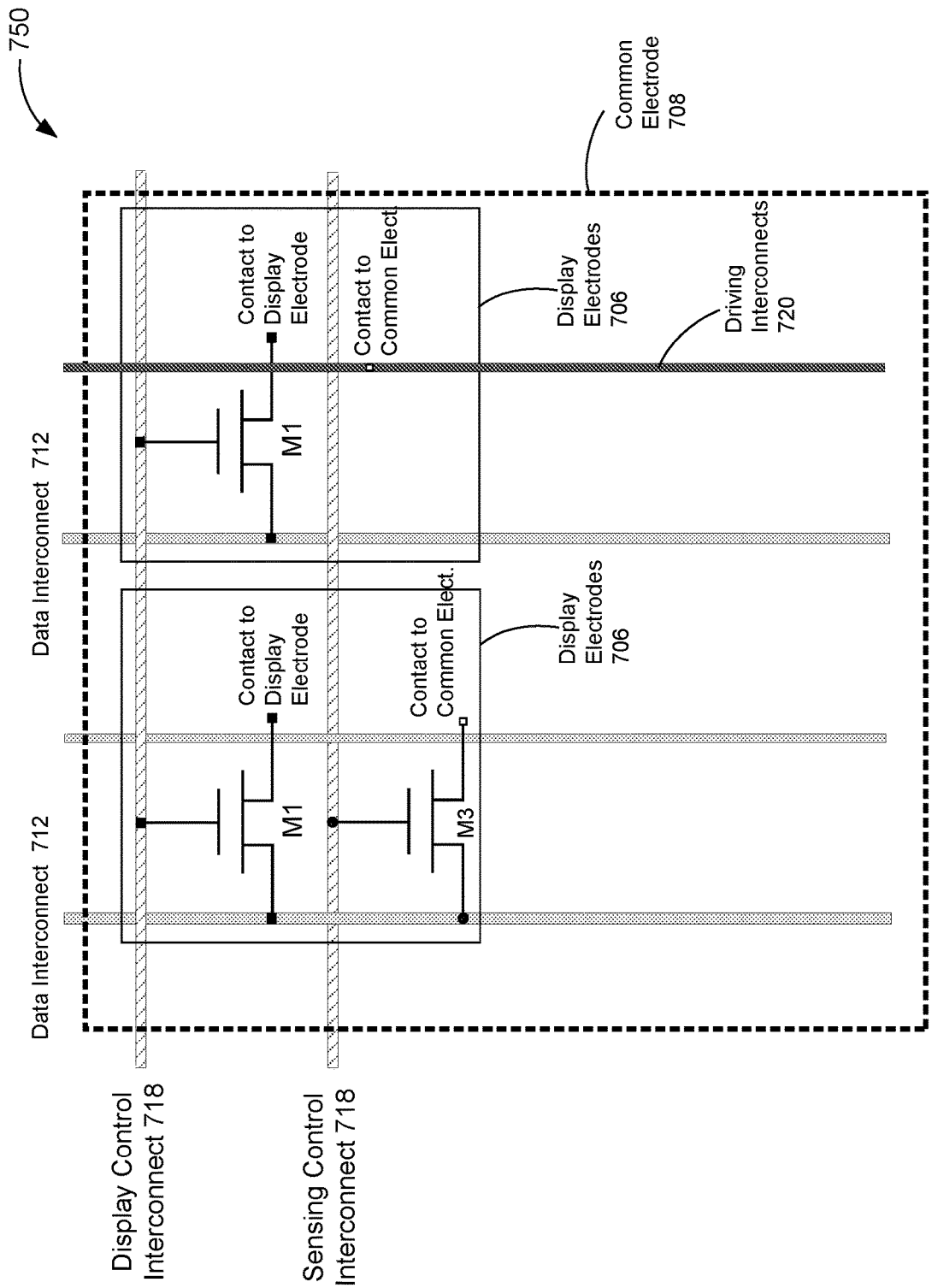
FIG. 7C is a circuit diagram of an interface circuit configured to drive a single display element in the 2D subarray of display elements and the single capacitive sense element in FIG. 7B, in accordance with some embodiments.

In some embodiments, an integrated display screen has a landscape orientation (e.g., the first dimension has a larger size than the second dimension). FIG. 7A is a top view of an example integrated display screen 700 of an electronic device having a landscape orientation in accordance with some embodiments. The integrated display screen 700 combines a 2D array of display elements and a 2D array of capacitive sense elements. FIG. 7B is a top view of a unit 730 of the integrated display screen 700. The unit 730 has a 2D subarray of display elements and a single capacitive sense element in accordance with some embodiments. FIG. 7C is a circuit diagram of an interface circuit 750 configured to drive a single display element in the 2D subarray of display elements and the single capacitive sense element in FIG. 7B in accordance with some embodiments.

The plurality of driving interconnects 720 extends along a second dimension (i.e., a smaller dimension) of the integrated display device 700. The integrated display device 700 has a first dimension that is perpendicular to and has a size larger than the second dimension. The capacitance sense circuit 101 and the pixel drive circuit 102 are disposed near a bottom side of the integrated display screen 700. For example, the 2D array of display electrodes 706 has 1080 rows and 2160 columns of display electrodes, and the 2D array of common electrodes 708 has 18 rows and 36 columns of common electrodes that are aligned with the 2D array of display electrodes 706. Each common electrode 708 corresponds to 60×60 display electrodes 706. Each of the 18 rows of common electrodes 708 corresponds to 3 driving interconnects 720 on average if the driving interconnects 720 are arranged along the second (i.e., smaller) dimension of the integrated display screen 700.

In addition to the driving interconnects 720, the integrated display device 700 has m rows and n columns of display elements 706, and also includes a plurality of display control interconnects 710, a plurality of data interconnects 712, and one or more sensing control interconnects 718. The plurality of display control interconnects 710 is perpendicular to the plurality of data interconnects 712, so that each of their intersections corresponds to a display element 706. A respective one of the first plurality of TFTs (M1) is formed at the respective display element 706, and configured to be controlled and driven by a respective display control interconnect 710 and a respective data interconnect 712 in the display driving mode. The sensing control interconnects 718 are also perpendicular to the plurality of data interconnects 712, so that each of their intersection corresponds to a common electrode 708 (i.e., a capacitive sense element). Each of a third plurality TFTs (M3) is formed at a respective common electrode 708, and configured to be controlled and accessed by a respective sensing control interconnect 718 and a respective data interconnect 712 in the touch sensing mode.

In some embodiments, the display control interconnects 710 and the sensing control interconnects 718 are arranged along the first dimension, and the data interconnects 712 are arranged along the second dimension in parallel with the driving interconnects 720. Alternatively, in some embodiments not shown in FIGS. 7A and 7B, the data interconnects 712 are arranged along the first dimension. The display control interconnects 710 and the sensing control interconnects 718 are arranged along the second dimension in parallel with the driving interconnects 720. For example, in the above 1080×2160 display element array, each common electrode 708 corresponds to 60×60 display electrodes 706. Each display electrode 706 corresponds to one or two vertical interconnects, so each common electrode 708 corresponds to 60 display control interconnects 710, three driving interconnects 720 for each 18 rows of common electrodes 708, and there are 1-6 sensing control interconnects 718 for each common electrode, arranged along the second dimension of the integrated display screen 700. For the common electrode 708 shown in FIG. 7B, three driving interconnects 720A are electrically coupled to the common electrode 708 via contacts, while up to 51 driving interconnects 720 coupled to other common electrodes 708 in the first column 716 are disposed over the common electrode 708 in FIG. 7B. The first row 714 of capacitive sense elements corresponds to m/k rows of display electrodes.

In some embodiments, a transistor M2A is electrically coupled to a first end of a driving interconnect 720A, and a transistor M2B is electrically coupled to a second end of the driving interconnect 720A that is opposite to the first end. The transistors M2A and M2B are configured to drive the driving interconnect 720A simultaneously. In some embodiments, given the landscape orientation, a single transistor M2 is disposed below the 2D array of display elements and configured to drive the driving interconnect 720A from one end only.

In some embodiments, an integrated display device (e.g., devices 600 and 700) includes two or three levels of metal interconnects configured to provide a plurality of data interconnects, a plurality of display control interconnects, a plurality of sensing control interconnects, and a plurality of driving interconnects. For example, a first level of metal interconnects are aligned with rows of the display element array of the integrated display device, and a second level of metal interconnects are arranged perpendicular to the first level of metal interconnects. Each of the interconnects is connected to a display electrode or a common electrode via one or more contacts.

Figure 8A:
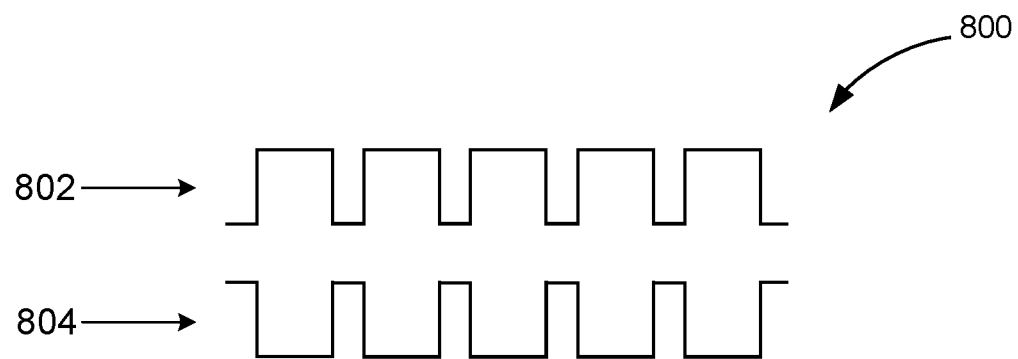
FIG. 8A is a time diagram of a display mode control and a sensing mode control, which enable a display driving mode and a touch sensing mode, in accordance with some embodiments.

FIG. 8A is a time diagram 800 of a display mode control 802 (e.g., the display driving enable signal 121 in FIG. 1) and a sensing mode control 804 (e.g., the touch detection enable signal 120 in FIG. 1), which enable a display driving mode and a touch sensing mode in accordance with some embodiments. The display driving mode and touch sensing mode are combined via time-division multiplexing. In the display driving mode, the first plurality of TFTs (M1) and the second transistors M2 are activated under the control of the display mode control 802 to drive the 2D array of display elements. For example, display data is sequentially written into the display elements row by row when the display mode control 802 is enabled (e.g., is high). In the touch sensing mode, the second plurality of transistors (M2) is activated under the control of the sensing mode control 804. For example, when the sensing mode control 804 is enabled (e.g., is high), capacitive sense elements made of common electrodes are scanned, and capacitive sense signals are read out from the capacitive sense elements via the data interconnects (e.g., the data interconnects 612 and 712).

In some embodiments, the display driving mode and the touch sensing mode operate with a frequency (e.g., 100 Hz), and have duty cycles of 90% and 10%, respectively. The display driving mode runs for 9 ms before it switches to the touch sensing mode, which runs for 1 ms before it returns to the display driving mode. In some embodiments, the 2D array of display elements of the integrated display screen (e.g., the arrays in FIGS. 6A-6C and 7A-7C) is configured to operate synchronously in the display driving mode, and the 2D array of capacitive sense elements (e.g., the arrays in FIGS. 6A and 7A) is configured to operate synchronously in the touch sensing mode. The same display mode control 802 and sensing mode control 804 are applied to control access to the entire integrated display device in the display driving mode and the touch sensing mode, respectively.

Figure 8B:
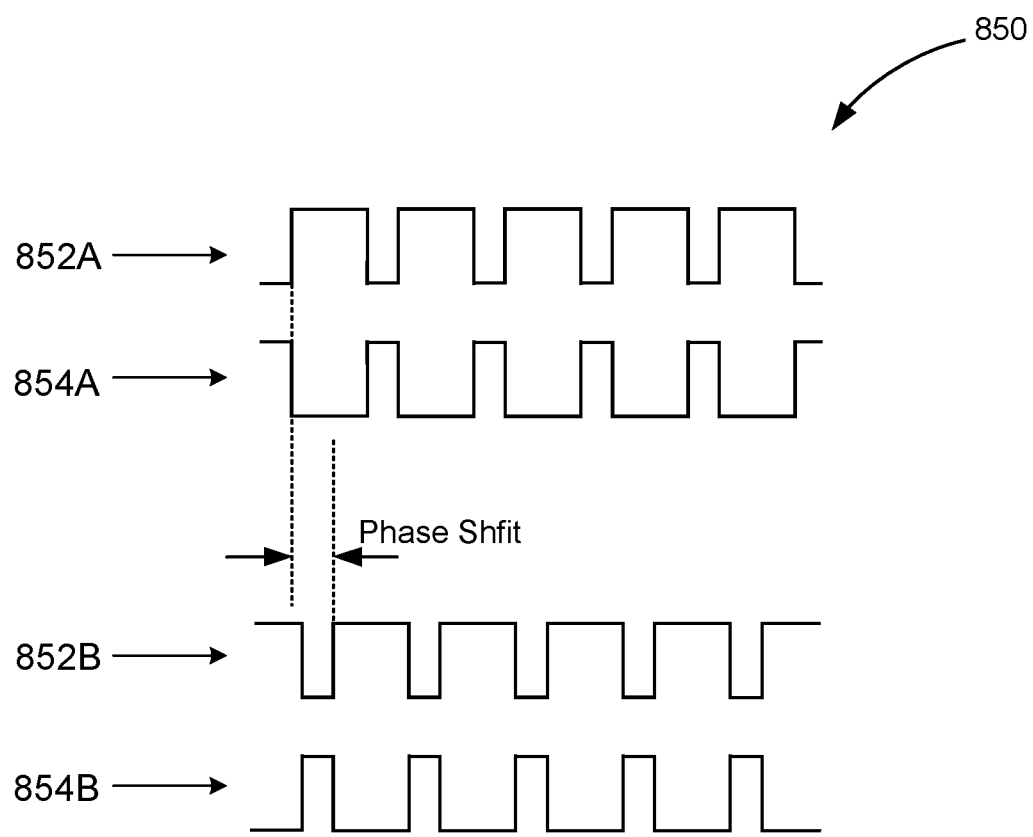
FIG. 8B is a time diagram of two display mode controls and two sensing mode controls, which control display driving modes and touch sensing modes of distinct subsets of an integrated display screen with a phase shift, in accordance with some embodiments.

FIG. 8B is a time diagram 850 of two display mode controls 852 and two sensing mode controls 854, which control display driving modes and touch sensing modes of distinct subsets of an integrated display screen (e.g., the screen 600 or the screen 700) with a phase shift, in accordance with some embodiments. In some embodiments, the integrated display device includes a first subset of display elements sharing common mode electrodes with a first subset of capacitive sense elements, and a second subset of display elements sharing common mode electrodes with a second subset of capacitive sense elements.

The first subset of display elements is configured to operate synchronously in a first display driving mode, and the second subset of display elements is configured to operate synchronously in a second display driving mode. The same first display mode control 852A is applied to control access to the first subset of display elements in the first display driving mode, so that data driving the first subset of display elements is refreshed within the duty cycle corresponding to the first display mode control 852A if needed. Likewise, the same second display mode control 852B is applied to control access to the second subset of display elements in the second display driving mode, so that data driving the second subset of display elements is refreshed within the duty cycle corresponding to the second display control 852B if needed. The second display driving mode is shifted from the first display driving mode by a phase (e.g., by 90 degrees).

The first subset of capacitive sense elements is configured to operate synchronously in a first touch sensing mode, and the second subset of capacitive sense elements is configured to operate synchronously in a second touch sensing mode. The same first sensing mode control 854A is applied to control access to the first subset of capacitive sense elements in the first touch sensing mode so that the first subset of capacitive sense elements is repeatedly scanned within the duty cycle corresponding to the first sensing mode control 854A. Likewise, the same second sensing mode control 854B is applied to control access to the second subset of capacitive sense elements in the second touch sensing mode so that the second subset of capacitive sense elements is repeatedly scanned within the duty cycle corresponding to the second sensing mode control 854B. The first touch sensing mode is integrated with the first display driving mode via time-division multiplexing. The second touch sensing mode is integrated with the second display driving mode with time-division multiplexing.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It will also be understood that, although the terms first and second are used herein to describe various elements, these elements should not be limited by these terms. These terms are only used to distinguish one element from another. For example, a first subset of capacitive sense elements can be termed a second subset of capacitive sense elements, and, similarly, a second subset of capacitive sense elements can be termed a first subset of capacitive sense elements, without departing from the scope of the various described embodiments. The first subset of capacitive sense elements and the second subset of capacitive sense elements are both subsets of capacitive sense elements, but they are not the same subset of capacitive sense elements.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, steps, operations, elements, components, structures and/or groups, but do not preclude the presence or addition of one or more other features, steps, operations, elements, components, structures, and/or groups thereof.

As used herein, the term "if" means "when," "upon," "in response to determining," "in response to detecting," or "in accordance with a determination that," depending on the context. Similarly, the phrase "if it is determined" or "if [a stated condition or event] is detected" means "upon determining," "in response to determining," "upon detecting [the stated condition or event]," "in response to detecting [the stated condition or event]," or "in accordance with a determination that [a stated condition or event] is detected," depending on the context.

What is claimed is:

1. An integrated display device, comprising:
   a two-dimensional array of display elements, each display element including (i) a respective display electrode located in a display electrode layer and (ii) a respective common electrode located in a common electrode layer, wherein the display electrode layer includes a two-dimensional array of display electrodes having m rows and n columns of display electrodes, and the common electrode layer includes a two-dimensional array of common electrodes having k rows and l columns of common electrodes;
   a two-dimensional array of capacitive sense elements, each capacitive sense element including a distinct one of the common electrodes of the two-dimensional array of display elements;
   one or more sensing control interconnects arranged on top of a first row of the k rows of common electrodes, each sensing control interconnect configured to provide a touch sensing control signal to enable/disable electrical access to common electrodes in the first row of common electrodes; and
   a plurality of driving interconnects arranged (i) on top of the first row of common electrodes and (ii) in parallel with the one or more sensing control interconnects, each common electrode in the first row of common electrodes electrically coupled to two or more respective driving interconnects of the plurality of driving interconnects, wherein each of the plurality of driving interconnects is electrically coupled to only one respective common electrode.

2. The integrated display device of claim 1, further comprising:
   a plurality of display control interconnects arranged (i) on top of the first row of common electrodes and (ii) in parallel with the one or more sensing control interconnects, each display control interconnect configured to provide a display control signal to enable/disable electrical access to display electrodes in a respective row of the m rows of display electrodes.

3. The integrated display device of claim 2, further comprising:
   a plurality of data interconnects arranged (i) on top of a first column of the l columns of common electrodes and (ii) perpendicular to the plurality of display control interconnects and the plurality of driving interconnects, each of the plurality of data interconnects electrically coupled to display electrodes in a respective column of the n columns of display electrodes.

4. The integrated display device of claim 3, further comprising a first plurality of thin film transistors (TFTs), wherein:
   each of the first plurality of TFTs corresponds to a respective display electrode, a respective one of the plurality of data interconnects, and a respective one of the plurality of display control interconnects, which are electrically coupled to a drain, a source, and a gate of the respective TFT, respectively;
   in a display driving mode, one of the first plurality of TFTs is turned on by the respective one of the plurality of display control interconnects, allowing data provided by the respective one of the plurality of data interconnects to be written into and drive the respective display electrode; and
   in the display driving mode, a respective one of the plurality of driving interconnects electrically couples the common electrode corresponding to the respective display electrode of the same display element to a reference voltage.

5. The integrated display device of claim 3, further comprising one or more third thin film transistors (TFTs), wherein:
   each of the one or more third TFTs corresponds to a respective common electrode, a respective one of the plurality of data interconnects, and a respective one of the plurality of sensing control interconnects, which are electrically coupled to a drain, a source, and a gate of the respective third TFT, respectively; and in a touch sensing mode, one of the third TFTs is turned on by the respective one of the plurality of sensing control interconnects, allowing a signal at the respective common electrode to be read to the respective one of the plurality of data interconnects.

6. The integrated display device of claim 2, wherein:
the first row of common electrodes corresponds to m/k rows of display electrodes; and
each row of the m/k rows of display electrodes corresponds to (1) a respective display control interconnect and (2) one of the driving interconnects or one of the sensing control interconnects.

7. The integrated display device of claim 2, wherein:
each of the k rows of common electrodes corresponds to (i) m/k rows of display electrodes and (ii) 2 m/k interconnects extending along a first direction; and
the 2 m/k interconnects include m/k rows of display control interconnects and two or more of the plurality of driving interconnects for each of the l columns of common electrodes, and remaining interconnects of the 2 m/k interconnects are used as the one or more sensing control interconnects to enable/disable the electrical access to the respective row of common electrodes.

8. The integrated display device of claim 7, wherein:
the two-dimensional array of display electrodes has 2160 rows and 1080 columns of display electrodes, and the two-dimensional array of common electrodes has 36 rows and 18 columns of common electrodes that are aligned with the two-dimensional array of display electrodes;
each common electrode corresponds to 60×60 display electrodes;
each common electrode corresponds to 60 display control interconnects and corresponds to six sensing control interconnects, which are arranged along a first dimension of the integrated display device, and there are three driving interconnects for each of 18 columns of common electrodes; and
each common electrode corresponds to 60 data interconnects arranged along a second dimension perpendicular to the first dimension of the integrated display device.

9. The integrated display device of claim 1, wherein the one or more sensing control interconnects and the plurality of driving interconnects extend along a first dimension of the integrated display device, the integrated display device has a second dimension that is perpendicular to the first dimension, and the second dimension of the integrated display device has a size that is greater than a size of the first dimension.

10. The integrated display device of claim 1, wherein the integrated display device has a portrait orientation.

11. The integrated display device of claim 1, wherein the integrated display device has a touch sensing mode and a display driving mode, which are integrated by time-division multiplexing.

12. The integrated display device of claim 11, wherein the two-dimensional array of display elements is configured to operate synchronously in the display driving mode, and the two-dimensional array of capacitive sense elements is configured to operate synchronously in the touch sensing mode.

13. The integrated display device of claim 12, wherein:
the integrated display device includes a first subset of display elements sharing common mode electrodes with a first subset of capacitive sense elements and includes a second subset of display elements sharing common mode electrodes with a second subset of capacitive sense elements;
the first subset of display elements is configured to operate synchronously in a first display driving mode, and the second subset of display elements is configured to operate synchronously in a second display driving mode, which is shifted from the first display driving mode by a phase; and
the first subset of capacitive sense elements is configured to operate synchronously in a first touch sensing mode, which is integrated with the first display driving mode with time-division multiplexing, and the second subset of capacitive sense elements is configured to operate synchronously in a second touch sensing mode, which is integrated with the second display driving mode with time-division multiplexing.

14. The integrated display device of claim 1, further comprising:
a first transistor electrically coupled to a first end of a first driving interconnect; and
a second transistor electrically coupled to a second end of the first driving interconnect, which is opposite to the first end, the first and second transistors being configured to drive the first driving interconnect simultaneously.

15. A computing machine, comprising:
one or more processors; and
memory storing one or more programs configured for execution by the one or more processors, the one or more programs comprising instructions for driving an integrated display unit;
wherein the integrated display unit, including:
a two-dimensional array of display elements, each display element including (i) a respective display electrode located in a display electrode layer and (ii) a respective common electrode located in a common electrode layer, wherein the display electrode layer includes a two-dimensional array of display electrodes having m rows and n columns of display electrodes, and the common electrode layer includes a two-dimensional array of common electrodes having k rows and l columns of common electrodes;
a two-dimensional array of capacitive sense elements, each capacitive sense element including a distinct one of the common electrodes of the two-dimensional array of display elements;
one or more sensing control interconnects arranged on top of a first row of the k rows of common electrodes, each sensing control interconnect configured to provide a touch sensing control signal to enable/disable electrical access to common electrodes in the first row of common electrodes; and
a plurality of driving interconnects arranged (i) on top of the first row of common electrodes and (ii) in parallel with the one or more sensing control interconnects, each common electrode in the first row of common electrodes electrically coupled to two or more respective driving interconnects of the plurality of driving interconnects, wherein each of the plurality of driving interconnects is electrically coupled to only one respective common electrode.

16. The computing machine of claim 15, wherein the one or more sensing control interconnects and the plurality of driving interconnects extend along a first dimension of the integrated display device, the integrated display device has a second dimension that is perpendicular to the first dimension, and the second dimension of the integrated display device has a size that is greater than a size of the first dimension.

17. The computing machine of claim 15, wherein the integrated display device has a touch sensing mode and a display driving mode, which are integrated by time-division multiplexing.

18. An electronic device, comprising:
   an integrated display unit, including:
   a two-dimensional array of display elements, each display element including (i) a respective display electrode located in a display electrode layer and (ii) a respective common electrode located in a common electrode layer, wherein the display electrode layer includes a two-dimensional array of display electrodes having m rows and n columns of display electrodes, and the common electrode layer includes a two-dimensional array of common electrodes having k rows and l columns of common electrodes;
   a two-dimensional array of capacitive sense elements, each capacitive sense element including a distinct one of the common electrodes of the two-dimensional array of display elements;
   one or more sensing control interconnects arranged on top of a first row of the k rows of common electrodes, each sensing control interconnect configured to provide a touch sensing control signal to enable/disable electrical access to common electrodes in the first row of common electrodes; and
   a plurality of driving interconnects arranged (i) on top of the first row of common electrodes and (ii) in parallel with the one or more sensing control interconnects, each common electrode in the first row of common electrodes electrically coupled to two or more respective driving interconnects of the plurality of driving interconnects, wherein each of the plurality of driving interconnects is electrically coupled to only one respective common electrode; and
   a processing device including at least a capacitance sense circuit configured to enable detection of touch events from the two-dimensional array of capacitive sense elements, and a pixel drive circuit configured to drive the two-dimensional array of display elements.

19. The electronic device of claim 18, wherein the one or more sensing control interconnects and the plurality of driving interconnects extend along a first dimension of the integrated display device, the integrated display device has a second dimension that is perpendicular to the first dimension, and the second dimension of the integrated display device has a size that is greater than a size of the first dimension.

20. The electronic device of claim 18, wherein the integrated display device has a touch sensing mode and a display driving mode, which are integrated by time-division multiplexing.

* * * * *